(12) United States Patent
Edwards

(10) Patent No.: US 9,559,903 B2
(45) Date of Patent: *Jan. 31, 2017

(54) CLOUD-BASED VIRTUAL MACHINES AND OFFICES

(71) Applicant: Axcient, Inc., Mountain View, CA (US)

(72) Inventor: William Scott Edwards, San Jose, CA (US)

(73) Assignee: Axcient, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,082

(22) Filed: Dec. 8, 2014

(65) Prior Publication Data

US 2015/0095691 A1 Apr. 2, 2015

Related U.S. Application Data

(63) Continuation of application No. 13/570,161, filed on Aug. 8, 2012, now Pat. No. 8,954,544.

(51) Int. Cl.

| | |
|---|---|
| *G06F 15/16* | (2006.01) |
| *H04L 12/24* | (2006.01) |
| *G06Q 10/10* | (2012.01) |
| *H04L 29/06* | (2006.01) |
| *G06F 11/14* | (2006.01) |
| *G06F 11/20* | (2006.01) |
| *H04L 29/14* | (2006.01) |
| *H04L 29/12* | (2006.01) |
| *H04L 29/08* | (2006.01) |

(52) U.S. Cl.
CPC ....... *H04L 41/0806* (2013.01); *G06F 11/1464* (2013.01); *G06F 11/1484* (2013.01); *G06F 11/203* (2013.01); *G06Q 10/10* (2013.01); *H04L 61/1511* (2013.01); *H04L 61/2015* (2013.01); *H04L 63/0272* (2013.01); *H04L 67/10* (2013.01); *H04L 69/40* (2013.01); *G06F 11/2023* (2013.01); *G06F 2201/84* (2013.01); *G06F 2201/85* (2013.01)

(58) Field of Classification Search
CPC ...... H04L 12/2818; H04L 41/00; H04L 67/10; H04L 67/1097; G06F 15/16
USPC .................. 709/220, 226, 250; 370/250, 332
See application file for complete search history.

(56) References Cited

U.S. PATENT DOCUMENTS

| | | | |
|---|---|---|---|
| 5,379,412 A | 1/1995 | Eastridge et al. | |
| 5,574,905 A | 11/1996 | deCarmo | |
| 5,860,107 A | 1/1999 | Patel | |

(Continued)

OTHER PUBLICATIONS

Li et al., "Efficient File Replication," U.S. Appl. No. 13/671,498, filed Nov. 7, 2012.

(Continued)

*Primary Examiner* — Tesfay Yohannes
(74) *Attorney, Agent, or Firm* — Carr & Ferrell LLP

(57) ABSTRACT

Cloud-based virtual machines and offices are provided herein. Methods may include establishing a cloud-based virtual office, by providing selections, corresponding to backups of servers of a computing network, to a user interface, establishing a cloud gateway for the virtual office, virtualizing a backup for each server using a virtualization program to create the cloud-based virtual office that includes virtual server machines networked with one another via the cloud gateway, and providing a workload to the cloud-based virtual office.

21 Claims, 30 Drawing Sheets

(56) References Cited

U.S. PATENT DOCUMENTS

| | | | |
|---|---|---|---|
| 6,122,629 A | 9/2000 | Walker et al. |
| 6,205,527 B1 | 3/2001 | Goshey et al. |
| 6,233,589 B1 | 5/2001 | Balcha et al. |
| 6,272,492 B1 | 8/2001 | Kay |
| 6,411,985 B1 | 6/2002 | Fujita et al. |
| 6,604,236 B1 | 8/2003 | Draper et al. |
| 6,629,110 B2 | 9/2003 | Cane et al. |
| 6,651,075 B1 | 11/2003 | Kusters et al. |
| 6,971,018 B1 | 11/2005 | Witt et al. |
| 7,024,581 B1 | 4/2006 | Wang et al. |
| 7,085,904 B2 | 8/2006 | Mizuno et al. |
| 7,266,655 B1 | 9/2007 | Escabi, II et al. |
| 7,401,192 B2 | 7/2008 | Stakutis et al. |
| 7,406,488 B2 | 7/2008 | Stager et al. |
| 7,546,323 B1 | 6/2009 | Timmins et al. |
| 7,620,765 B1 | 11/2009 | Ohr et al. |
| 7,631,155 B1 | 12/2009 | Bono et al. |
| 7,647,338 B2 | 1/2010 | Lazier et al. |
| 7,676,763 B2 | 3/2010 | Rummel |
| 7,730,425 B2 | 6/2010 | de los Reyes et al. |
| 7,743,038 B1 | 6/2010 | Goldick |
| 7,752,487 B1 | 7/2010 | Feeser et al. |
| 7,769,731 B2 | 8/2010 | O'Brien |
| 7,797,582 B1 | 9/2010 | Stager et al. |
| 7,809,688 B2 | 10/2010 | Cisler et al. |
| 7,832,008 B1 | 11/2010 | Kraemer |
| 7,844,850 B2 | 11/2010 | Yasuzato |
| 7,873,601 B1 | 1/2011 | Kushwah |
| 7,930,275 B2 | 4/2011 | Chen et al. |
| 7,966,293 B1 | 6/2011 | Owara et al. |
| 8,037,345 B1 | 10/2011 | Iyer et al. |
| 8,046,632 B2 | 10/2011 | Miwa et al. |
| 8,060,476 B1 | 11/2011 | Afonso et al. |
| 8,099,391 B1 | 1/2012 | Monckton |
| 8,099,572 B1 | 1/2012 | Arora et al. |
| 8,117,163 B2 | 2/2012 | Brown et al. |
| 8,200,926 B1* | 6/2012 | Stringham | G06F 11/1448 711/162 |
| 8,224,935 B1 | 7/2012 | Bandopadhyay et al. |
| 8,244,914 B1* | 8/2012 | Nagarkar | G06Q 10/107 707/609 |
| 8,245,156 B2 | 8/2012 | Mouilleseaux et al. |
| 8,260,742 B2 | 9/2012 | Cognigni et al. |
| 8,279,174 B2 | 10/2012 | Jee et al. |
| 8,296,410 B1 | 10/2012 | Myhill et al. |
| 8,321,688 B2* | 11/2012 | Auradkar | G06F 11/1464 380/44 |
| 8,332,442 B1 | 12/2012 | Greene |
| 8,352,717 B2 | 1/2013 | Campbell et al. |
| 8,381,133 B2 | 2/2013 | Iwema et al. |
| 8,402,087 B2 | 3/2013 | O'Shea et al. |
| 8,407,190 B2 | 3/2013 | Prahlad et al. |
| 8,412,680 B1 | 4/2013 | Gokhale et al. |
| 8,417,674 B2 | 4/2013 | Provenzano |
| 8,504,785 B1 | 8/2013 | Clifford et al. |
| 8,549,432 B2 | 10/2013 | Warner |
| 8,572,337 B1* | 10/2013 | Gokhale | G06F 11/1466 707/639 |
| 8,589,350 B1 | 11/2013 | Lalonde et al. |
| 8,589,913 B2 | 11/2013 | Jelvis et al. |
| 8,600,947 B1* | 12/2013 | Freiheit | G06F 11/1458 707/634 |
| 8,601,389 B2 | 12/2013 | Schulz et al. |
| 8,606,752 B1 | 12/2013 | Beatty et al. |
| 8,639,917 B1* | 1/2014 | Ben-Shaul | G06F 17/30168 709/222 |
| 8,676,273 B1* | 3/2014 | Fujisaki | 455/567 |
| 8,886,611 B2 | 11/2014 | Caputo |
| 8,924,360 B1 | 12/2014 | Caputo |
| 8,954,544 B2 | 2/2015 | Edwards |
| 9,104,621 B1 | 8/2015 | Caputo |
| 9,110,964 B1 | 8/2015 | Shilane et al. |
| 9,213,607 B2 | 12/2015 | Lalonde et al. |
| 9,235,474 B1 | 1/2016 | Petri et al. |
| 9,292,153 B1 | 3/2016 | Edwards et al. |
| 9,397,907 B1 | 7/2016 | Edwards et al. |
| 2001/0034737 A1 | 10/2001 | Cane et al. |
| 2001/0056503 A1* | 12/2001 | Hibbard | 709/250 |
| 2002/0169740 A1 | 11/2002 | Korn |
| 2003/0011638 A1 | 1/2003 | Chung |
| 2003/0158873 A1 | 8/2003 | Sawdon et al. |
| 2003/0208492 A1 | 11/2003 | Winiger et al. |
| 2004/0044707 A1 | 3/2004 | Richard |
| 2004/0073560 A1 | 4/2004 | Edwards |
| 2004/0093474 A1 | 5/2004 | Lin et al. |
| 2004/0233924 A1 | 11/2004 | Bilak et al. |
| 2004/0260973 A1 | 12/2004 | Michelman |
| 2005/0010835 A1 | 1/2005 | Childs et al. |
| 2005/0027748 A1 | 2/2005 | Kisley |
| 2005/0114290 A1 | 5/2005 | Borthakur et al. |
| 2005/0154937 A1 | 7/2005 | Achiwa |
| 2005/0171979 A1 | 8/2005 | Stager et al. |
| 2005/0223043 A1 | 10/2005 | Randal et al. |
| 2005/0278583 A1 | 12/2005 | Lennert et al. |
| 2005/0278647 A1 | 12/2005 | Leavitt et al. |
| 2006/0013462 A1 | 1/2006 | Sadikali |
| 2006/0047720 A1 | 3/2006 | Kulkarni et al. |
| 2006/0064416 A1 | 3/2006 | Sim-Tang |
| 2006/0224636 A1 | 10/2006 | Kathuria et al. |
| 2007/0033301 A1 | 2/2007 | Aloni et al. |
| 2007/0112895 A1 | 5/2007 | Ahrens et al. |
| 2007/0176898 A1 | 8/2007 | Suh |
| 2007/0180207 A1 | 8/2007 | Garfinkle |
| 2007/0204166 A1* | 8/2007 | Tome | H04L 63/0272 713/182 |
| 2007/0208918 A1 | 9/2007 | Harbin et al. |
| 2007/0220029 A1 | 9/2007 | Jones et al. |
| 2007/0226400 A1 | 9/2007 | Tsukazaki |
| 2007/0233699 A1 | 10/2007 | Taniguchi et al. |
| 2007/0250302 A1 | 10/2007 | Xu et al. |
| 2007/0260842 A1 | 11/2007 | Faibish et al. |
| 2007/0276916 A1 | 11/2007 | McLoughlin et al. |
| 2007/0283017 A1 | 12/2007 | Anand et al. |
| 2007/0283343 A1 | 12/2007 | Aridor et al. |
| 2007/0288525 A1 | 12/2007 | Stakutis et al. |
| 2007/0288533 A1 | 12/2007 | Srivastava et al. |
| 2007/0294321 A1 | 12/2007 | Midgley et al. |
| 2008/0005468 A1 | 1/2008 | Faibish et al. |
| 2008/0010422 A1 | 1/2008 | Suzuki et al. |
| 2008/0027998 A1 | 1/2008 | Hara |
| 2008/0036743 A1 | 2/2008 | Westerman et al. |
| 2008/0082310 A1 | 4/2008 | Sandorfi et al. |
| 2008/0141018 A1 | 6/2008 | Tanaka et al. |
| 2008/0162590 A1 | 7/2008 | Kundu et al. |
| 2008/0162607 A1 | 7/2008 | Torii et al. |
| 2008/0201315 A1 | 8/2008 | Lazier et al. |
| 2008/0229050 A1 | 9/2008 | Tillgren |
| 2008/0307345 A1 | 12/2008 | Hart et al. |
| 2008/0307527 A1 | 12/2008 | Kaczmarski et al. |
| 2009/0089253 A1 | 4/2009 | Huang et al. |
| 2009/0164527 A1 | 6/2009 | Spektor et al. |
| 2009/0185500 A1* | 7/2009 | Mower | H04L 12/2697 370/250 |
| 2009/0216973 A1 | 8/2009 | Nakajima et al. |
| 2009/0309849 A1 | 12/2009 | Iwema et al. |
| 2009/0319653 A1 | 12/2009 | Lorenz et al. |
| 2009/0327964 A1 | 12/2009 | Mouilleseaux et al. |
| 2010/0077165 A1 | 3/2010 | Lu et al. |
| 2010/0095077 A1 | 4/2010 | Lockwood |
| 2010/0104105 A1 | 4/2010 | Schmidt et al. |
| 2010/0107155 A1* | 4/2010 | Banerjee et al. | 717/177 |
| 2010/0114832 A1 | 5/2010 | Lillibridge et al. |
| 2010/0165947 A1* | 7/2010 | Taniuchi | H04L 12/5692 370/331 |
| 2010/0179973 A1 | 7/2010 | Carruzzo |
| 2010/0192103 A1 | 7/2010 | Cragun et al. |
| 2010/0205152 A1 | 8/2010 | Ansari et al. |
| 2010/0228999 A1 | 9/2010 | Maheshwari et al. |
| 2010/0235831 A1 | 9/2010 | Dittmer |
| 2010/0262637 A1 | 10/2010 | Akagawa et al. |
| 2010/0268689 A1 | 10/2010 | Gates et al. |
| 2010/0318748 A1 | 12/2010 | Ko et al. |
| 2010/0325377 A1 | 12/2010 | Lango et al. |

(56) References Cited

U.S. PATENT DOCUMENTS

| | | |
|---|---|---|
| 2010/0332454 A1 | 12/2010 | Prahlad et al. |
| 2011/0041004 A1 | 2/2011 | Miwa et al. |
| 2011/0047405 A1 | 2/2011 | Marowsky-Bree et al. |
| 2011/0055399 A1* | 3/2011 | Tung .................... G06F 9/5072 709/226 |
| 2011/0055471 A1 | 3/2011 | Thatcher et al. |
| 2011/0055500 A1 | 3/2011 | Sasson et al. |
| 2011/0082998 A1 | 4/2011 | Boldy et al. |
| 2011/0106768 A1 | 5/2011 | Khanzode et al. |
| 2011/0154268 A1 | 6/2011 | Trent, Jr. et al. |
| 2011/0218966 A1 | 9/2011 | Barnes et al. |
| 2011/0238937 A1 | 9/2011 | Murotani et al. |
| 2011/0264785 A1 | 10/2011 | Newman et al. |
| 2011/0265143 A1 | 10/2011 | Grube et al. |
| 2011/0302502 A1 | 12/2011 | Hart et al. |
| 2012/0013540 A1 | 1/2012 | Hogan |
| 2012/0065802 A1* | 3/2012 | Seeber .................. G06F 1/3203 700/295 |
| 2012/0084501 A1 | 4/2012 | Watanabe et al. |
| 2012/0124307 A1 | 5/2012 | Ashutosh et al. |
| 2012/0130956 A1 | 5/2012 | Caputo |
| 2012/0131235 A1 | 5/2012 | Nageshappa et al. |
| 2012/0179655 A1 | 7/2012 | Beatty et al. |
| 2012/0204060 A1 | 8/2012 | Swift et al. |
| 2012/0210398 A1 | 8/2012 | Triantafillos et al. |
| 2013/0018946 A1 | 1/2013 | Brown et al. |
| 2013/0024426 A1 | 1/2013 | Flowers et al. |
| 2013/0036095 A1 | 2/2013 | Titchener et al. |
| 2013/0091183 A1 | 4/2013 | Edwards et al. |
| 2013/0091471 A1 | 4/2013 | Gutt et al. |
| 2013/0166511 A1* | 6/2013 | Ghatty .............. G06F 17/30289 707/649 |
| 2013/0238752 A1 | 9/2013 | Park et al. |
| 2013/0318046 A1 | 11/2013 | Clifford et al. |
| 2014/0006858 A1 | 1/2014 | Helfman et al. |
| 2014/0032498 A1 | 1/2014 | Lalonde et al. |
| 2014/0047081 A1 | 2/2014 | Edwards |
| 2014/0053022 A1* | 2/2014 | Forgette et al. ................ 714/21 |
| 2014/0089619 A1 | 3/2014 | Khanna et al. |
| 2014/0149358 A1 | 5/2014 | Aphale et al. |
| 2014/0189680 A1 | 7/2014 | Kripalani |
| 2014/0303961 A1 | 10/2014 | Leydon et al. |
| 2015/0046404 A1 | 2/2015 | Caputo |
| 2016/0054911 A1 | 2/2016 | Edwards et al. |
| 2016/0055062 A1 | 2/2016 | Petri et al. |
| 2016/0105312 A1 | 4/2016 | Edwards |
| 2016/0110261 A1 | 4/2016 | Parab et al. |
| 2016/0162349 A1 | 6/2016 | Edwards et al. |

OTHER PUBLICATIONS

Notice of Allowance, Oct. 22, 2015, U.S. Appl. No. 13/030,073, filed Feb. 17, 2011.
Non-Final Office Action, Oct. 30, 2015, U.S. Appl. No. 13/789,565, filed Mar. 7, 2013.
Notice of Allowance, Oct. 21, 2015, U.S. Appl. No. 13/789,578, filed Mar. 7, 2013.
Notice of Allowance, Sep. 8, 2015, U.S. Appl. No. 14/037,231, filed Sep. 25, 2013.
Non-Final Office Action, Oct. 5, 2016, U.S. Appl. No. 14/970,480, filed Dec. 15, 2015.
Non-Final Office Action, Jun. 17, 2015, U.S. Appl. No. 13/889,164, filed May 7, 2013.
Advisory Action, May 12, 2015, U.S. Appl. No. 13/671,498, filed Nov. 7, 2012.
Advisory Action, Jun. 10, 2015, U.S. Appl. No. 13/671,498, filed Nov. 7, 2012.
Non-Final Office Action, May 20, 2015, U.S. Appl. No. 13/633,695, filed Oct. 2, 2012.
Final Office Action, May 27, 2015, U.S. Appl. No. 13/789,565, filed Mar. 7, 2013.
Final Office Action, Jun. 3, 2015, U.S. Appl. No. 13/789,578, filed Mar. 7, 2013.
Advisory Action, Jun. 10, 2015, U.S. Appl. No. 14/037,231, filed Sep. 25, 2013.
Non-Final Office Action, Jul. 9, 2015, U.S. Appl. No. 14/037,231, filed Sep. 25, 2013.
Notice of Allowance, Jun. 5, 2015, U.S. Appl. No. 14/534,017, filed Nov. 5, 2014.
Non-Final Office Action, Jun. 1, 2016, U.S. Appl. No. 15/019,951, filed Feb. 9, 2016.
Non-Final Office Action, Jun. 28, 2016, U.S. Appl. No. 13/671,498, filed Nov. 7, 2012.
Final Office Action, Jul. 26, 2016, U.S. Appl. No. 13/889,164, filed May 7, 2013.
Non-Final Office Action, Aug. 10, 2016, U.S. Appl. No. 14/522,527, filed Oct. 23, 2014.
Non-Final Office Action, Aug. 23, 2016, U.S. Appl. No. 13/633,695, filed Oct. 2, 2012.

* cited by examiner

2000

| Field | Description | Values |
|---|---|---|
| Client Information Section | | |
| Name | Displays the client name. | (record creator defined) |
| Domain | Displays the domain name for this client (for example, axcient.com). | (valid domain name) |
| Login Name | Displays the client display name. | (record creator defined) |
| Login Username | Displays the client login name. | (record creator defined) |
| Login Email | Displays the client e-mail address. | (record creator defined) |
| Current Status Section | | |
| RIGHT NOW | Displays the number of servers in each state currently. A number icon and descriptive text appears for each active state. (Information about unused states is not displayed.) See the "Server VM States" section at the end of this table for a description of each state. | 1 - total_servers is server_state<br>Offline<br>Starting<br>Rendering<br>Running<br>Ready<br>Stopping<br>Canceling<br>Discarding |
| Server Information Section | | |
| Hostname | Displays the alias name of the device. If no alias was specified, displays the server address (host name or IP address). | (device alias) |
| VM Status | Displays the current state of this server VM. See the "Server VM States" section at the end of this table for a description of each state. | Offline<br>Starting<br>Rendering<br>Running<br>Ready<br>Stopping<br>Canceling<br>Discarding |
| VNC Port | Displays the port number to use when logging into the server VM through a VNC client (see "Access, Shutdown, or Restart Server VM" on page 107). A value appears only when the server VM is running. | (port or blank) |
| VNC Password | Displays the password to use when logging into the server VM through a VNC client (see "Access, Shutdown, or Restart Server VM" on page 107). A value appears only when the server VM is running. | (password or blank) |

FIG. 21A

| Field | Description | Values |
|---|---|---|
| VM RAM | Displays the amount of RAM allocated to this server VM (see "Start Cloud Server VM" on page 101). | 1 - max_allowed GB |
| CPU Cores | Displays the number of CPU cores allocated to this server VM (see "Start Cloud Server VM" on page 101). | 1 - max_allowed |
| (actions) | Pull-down list at the far right displays action choices. Actions are state dependent, so only those actions applicable to the state indicated in the VM Status field are displayed. Available actions for each state are listed below. A test VM includes actions that are not allowed in production. The Login action opens a VNC viewer (see "Access, Shutdown, or Restart Server VM" on page 107) <br><br> State / Action <br> Offline / Render <br> Rendering / Cancel <br> Ready / Start, Discard <br> Starting / Discard <br> Running / Stop, Login, Discard (test only) <br> Stopping / Discard (test only) <br> Discarding / (none) <br> Canceling / (none) | Render <br> Start <br> Stop <br> Discard <br> Cancel <br> Login |
| Configuration Tab Section | | |
| What's Next? | Click on tab to display a summary of configuration options. | (n/a) |
| Network Settings | Click on tab to display or edit network settings (see "Network Settings" on page 92). Connected means outbound IP is enabled; Disabled means it is not. | Disabled (default) <br> Connected |
| Port Forward Settings | Click on tab to display or edit port forwarding settings (see "Port Forwarding Settings" on page 96). | Disabled (default) <br> Enabled |
| DHCP Settings | Click on tab to display or edit DHCP settings (see "DHCP Settings" on page 97). | Disabled (default) <br> Enabled |
| VPN Settings | Click on tab to display or edit VPN settings (see "VPN Settings" on page 93). | Disabled (default) <br> Enabled |

FIG. 21B

| Field | Description | Values |
|---|---|---|
| Server VM States | | |
| Offline | Offline state means a VM has not been started for this server. This is the initial state for all servers. | (n/a) |
| Starting | Starting state means the server VM is in the start up process. (A server VM must be rendered before it can be started.) | (n/a) |
| Rendering | Rendering state means the target server image (restore point) is being prepared to function as a server VM. Any server in the offline state must first be rendered before it can be started. | (n/a) |
| Running | Running state means the server VM is up and running normally. | (n/a) |
| Ready | Ready state means the server image has been rendered, but a server VM has not been started or was stopped previously. | (n/a) |
| Stopping | Stopping state means a running server VM is being shutdown. After it is shutdown, it can be restarted again. | (n/a) |
| Canceling | Canceling state means that during the rendering process, a cancel action was invoked, and the rendering process is being stopped. | (n/a) |
| Discarding | Discarding state means a running server VM is being shutdown and dismantled completely. All history of the running VM is lost.<br>• After discarding a VM, you can start another VM for that server, but the VM contains the selected restore point data only. It will not include any of the changes from the previously running VM. Use the stop action (not the discard action) to shutdown a VM and preserve the changes.<br>• Discarding a running (or shutdown) server VM is allowed in a test failover only; you cannot discard a server VM in a production failover. | (n/a) |

FIG. 21C

CLOUD-BASED VIRTUAL MACHINES AND OFFICES

CROSS-REFERENCE TO RELATED APPLICATIONS

This non-provisional U.S. patent application is a continuation of and claims the priority benefit of U.S. patent application Ser. No. 13/570,161, filed on Aug. 8, 2012, entitled "Cloud-Based Virtual Machines and Offices," now U.S. Pat. No. 8,954,544, issued on Feb. 10, 2015, which is hereby incorporated by reference herein, including all references cited therein.

This non-provisional U.S. patent application is related to U.S. patent application Ser. No. 12/895,275, filed on Sep. 30, 2010, entitled "Systems and Methods for Restoring a File"; U.S. patent application Ser. No. 13/030,073, filed on Feb. 17, 2011, entitled "Systems and Methods for Maintaining a Virtual Failover Volume of a Target Computing System"; and U.S. patent application Ser. No. 13/437,738, filed on Apr. 2, 2012, entitled "Systems, Methods, and Media for Synthesizing Views of File System Backups", now U.S. Pat. No. 8,589,350, issued on Nov. 19, 2013—all of which are hereby incorporated by reference herein in their entireties.

FIELD OF THE TECHNOLOGY

Embodiments of the disclosure relate to systems and methods that facilitate interaction with backup file structures, and more specifically, but not by way of limitation, to the management of cloud-based virtual machines and virtual offices.

BACKGROUND OF THE DISCLOSURE

Remote backup systems often comprise snapshots and incremental files that are generated for a target source such as a file system, database or other digital storage media. These files may be backed up to a cloud-based storage environment and may be accessed upon the occurrence of a failure event. Unfortunately, system administrators may be unable to determine the content included in the snapshots or incremental files, the difference between snapshots, or other pertinent information, and may therefore be unable to readily determine an appropriate backup to access for recovering a particular machine state or application. Restoration of file system backups are an expensive and time-consuming process, and indiscriminate restoration only increases such deleterious effects.

SUMMARY OF THE DISCLOSURE

According to some embodiments, the present technology may be directed to methods for managing a cloud-based virtual machine, the method comprising: (a) providing one or more selections corresponding to one or more backups of a computing device via a user interface to an end user; (b) receiving a selection of at least one of the one or more backups; (c) receiving configuration details for the computing device, the configuration details comprising computing resources that are to be dedicated to a cloud-based virtual machine that corresponds to the computing device; (d) virtualizing the backup within the cloud computing environment using a virtualization program to create the cloud-based virtual office having the specified configuration details; and (e) providing access to the cloud-based virtual office to a remote user.

According to some embodiments, the present technology may be directed to methods for establishing a cloud-based virtual office. The methods may comprise the steps of: (a) providing selections, corresponding to backups of servers of a computing network, to a user interface; (b) establishing a cloud gateway for the virtual office; (c) virtualizing a backup for each selected server using a virtualization program to create the cloud-based virtual office that includes virtual server machines networked with one another via the cloud gateway; and (d) providing a workload to the cloud-based virtual office.

In other embodiments, the present technology may be directed to a cloud-based virtual office executing within a computing environment, the cloud-based virtual office comprising virtual server machines that correspond to servers of a physical network, each virtual server machine being virtualized by a virtualization program from a backup of a physical server, the backup of the physical server being stored within memory of the computing environment, the virtualization program being executed by a processor of the computing environment upon an occurrence of a failover event, the processor further establishing a cloud gateway that networks the virtual server machines together.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 16 illustrates establishing site-to-site VPN using a static IP address and FIG. 17 illustrates establishing site-to-site VPN using a DHCP address assignment.

FIGS. 21A-C each include a section of a table of exemplary client information details that may define aspects of a client.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown at block diagram form only in order to avoid obscuring the disclosure.

Generally described, the present technology offers end users protection in the case of a site disaster by providing a virtual office in the "cloud," that supports servers running as failover virtual machines (VMs) in an exemplary data center. As will be described in greater detail herein, the present technology also allows end users to configure and/or manage these virtual offices by way of user interfaces that are simple to utilize, yet powerful.

The present technology may allow end users, such as system administrators, to establish and/or manage a virtual office, also known as a cloud-based virtual office or network. A cloud-based virtual office may comprise two or more virtual machines that are arranged into a networked computing system architecture. Thus, in the event of a failure of a physical (e.g., bare metal, hardware-based) computing network, the present technology may allow for failover to a cloud-based virtual office that provides the functionalities of the physical computing network.

Prior to the creation of a cloud-based virtual office, the present technology may generate file system backups for a plurality of computing systems of a network such as servers. More specifically, the present technology may process incremental files such as reverse incremental delta increments, along with other reverse differential backup functionalities such as methods for restoring a file or disk as described in U.S. patent application Ser. No. 12/895,275, filed on Sep. 30, 2010, entitled "Systems and Methods for Restoring a File"—which is hereby incorporated by reference herein in its entirety.

Additionally, prior to creating a cloud-based virtual office, the present technology may allow end users to browse the backed-up files as described in U.S. patent application Ser. No. 13/437,738, filed on Apr. 2, 2012, entitled "Systems, Methods, and Media for Synthesizing Views of File System Backups", now U.S. Pat. No. 8,589,350, issued on Nov. 19, 2013—which is hereby incorporated by reference herein in its entirety.

Figure 1:
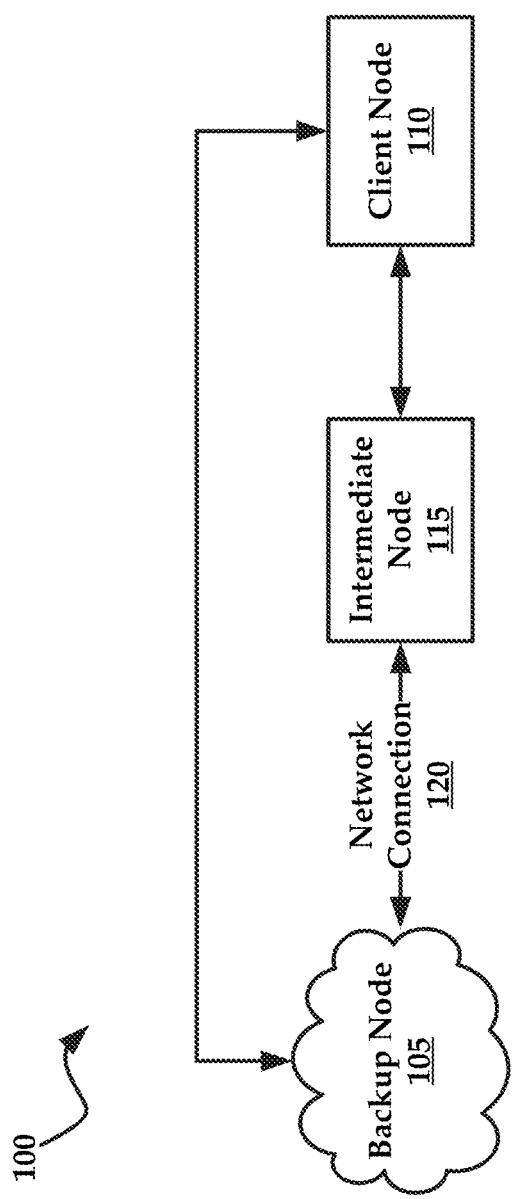
FIG. 1 illustrates an exemplary system for practicing aspects of the present technology.

FIG. 1 illustrates an exemplary system 100 for practicing aspects of the present technology. The system 100 may include a backup node 105 that receives file system backup data from a plurality of client nodes, such as client node 110. The backup node 105 may include an individual server that includes a storage media, while in other embodiments the backup node 105 may include a cloud-based computing environment that is configured to store file system backups received from the client node 110. In some instances, the client node 110 may comprise a physical network of a plurality of computing devices that are networked together. Thus, the file system backup data may be stored for each of the plurality of computing devices of the physical network.

To increase protection and integrity of the file system backups stored in the backup node, the system 100 may also include an intermediary node 115 disposed between the backup node 105 and the client node 110. The intermediary node 115 may be communicatively couplable with the backup node 105 via a network connection 120. The network connection 120 may include any one of a number of public or private communications mediums, although in one embodiment, the network connection 120 may employ a secure protocol that encrypts data transmitted between the backup node 105 and the intermediary node 115.

Additionally, the client node 110 may interact with the intermediary node 115 via any one of a number of authentication methods, for example, a private/public key pair, or any other means of authentication that would be known to one of ordinary skill in the art with the present disclosure before them, such as a username and password.

In some embodiments, the backup node 105 may expose views of a backed up file system to the intermediary node 115, rather than exposing the views directly to the client node 110. The exposing of the view to the intermediary node 115 may preserve the integrity of the file system backup by preventing direct access to the file system backups. In short, the intermediary node 115 limits access to the data stored on the backup node 105.

In some embodiments, the backup node 105 may comprise a cloud-based computing environment, which is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™, or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depend on the type of business associated with the user.

In the event of a server failure (e.g., failover event), end users can failover that server as a virtual machine (VM) on a local failover appliance (not shown herein but described in greater detail in U.S. patent application Ser. No. 13/030,073, filed on Feb. 17, 2011, entitled "Systems and Methods for Maintaining a Virtual Failover Volume of a Target Computing System"). However, if there is a site disaster (e.g., failure of at least a portion of the networked computing environment) or the local failover appliance fails, end users can still failover a server or the entire network as a VM in the "cloud," that is running, for example, on the backup node 105.

According to some embodiments, the present technology allows end users to create a cloud-based virtual office running on the backup (e.g., the backup cloud) of intermediary node. The operational characteristics of the cloud-based virtual office may substantially match the operational characteristics of the physical network of the end user. Additionally, end users may configure network settings for the cloud-based virtual office to provide secure access to the cloud-based virtual office by configuring virtual private network (VPN). Additionally, end users may allow network access to VMs of the cloud-based virtual office by configuring port forwarding, and/or allow VMs access to the Internet by enabling outbound connections. For security purposes, VM access to the Internet may be disabled by default. In some instances, the present technology may also provide dynamic host configuration protocol (DHCP) functionality for the cloud-based virtual office.

The present technology may allow end users to start the VMs (however many) of the cloud-based virtual office from restore points (backup versions) of the end user's choosing.

Figures 2A, 2B:
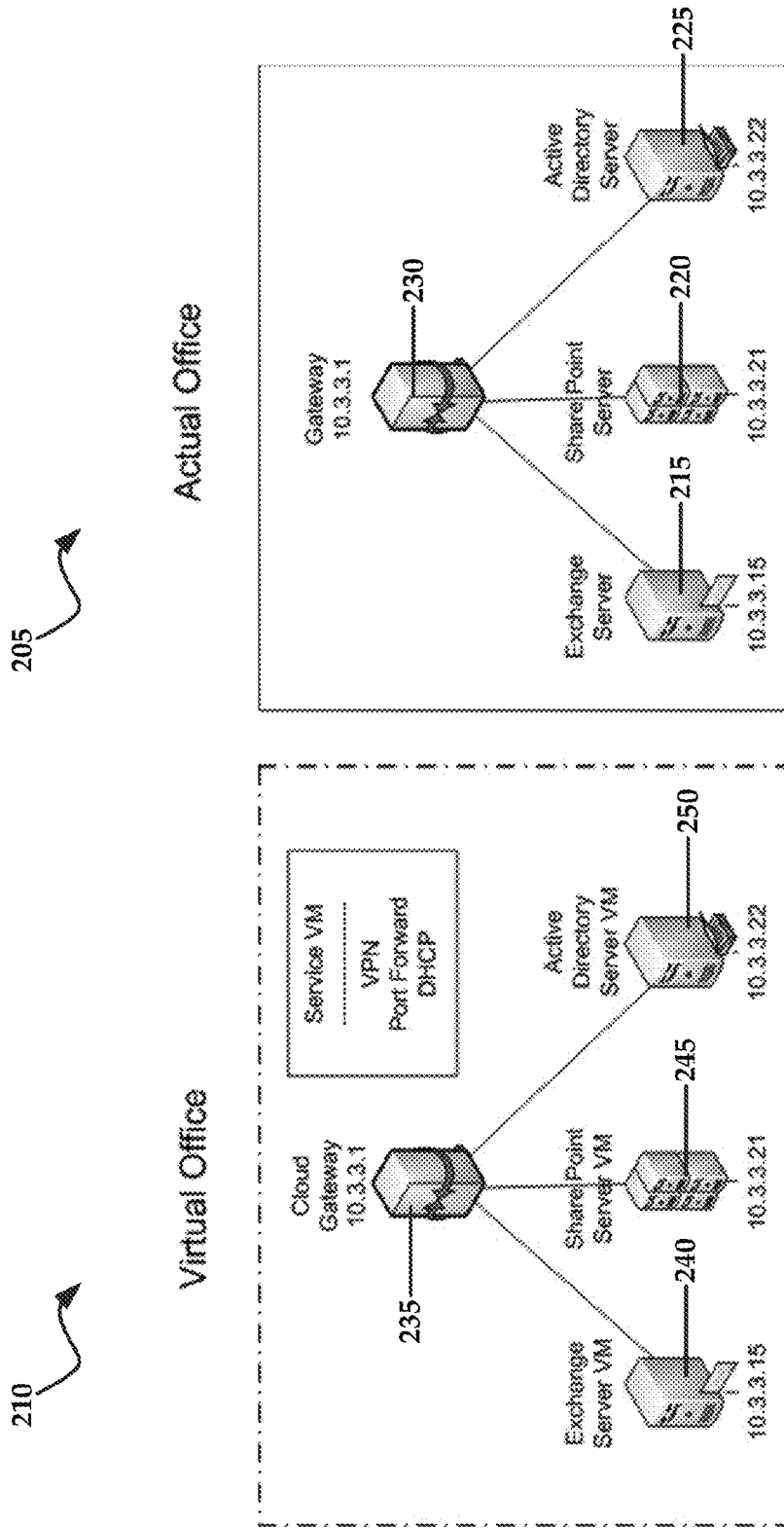
FIG. 2A is a schematic diagram of an exemplary Actual Office (also known as a physical network).
FIG. 2B is a schematic diagram of an exemplary Cloud-Based Virtual Office.

Referring now to FIGS. 2A and 2B, showing an actual office (e.g., physical computing devices) 205 and a complementary cloud-based virtual office 210. By way of non-limiting example, consider the actual office 205 that has separate servers such as an Exchange® server (server 215 with an internal static IP address of 10.3.3.15), a SharePoint® server (server 220 with an internal static IP address of 10.3.3.21), and an Active Directory® server (server 225 with an internal static IP address of 10.3.3.22). All of these servers may be connected through a physical gateway server 230 with an IP address of 10.3.3.1.

It will be understood that an image backup job may be created for each server of the actual office 205, and the backups may be saved both onsite and offsite, such as on the backup node 105. Assume that the actual office 205 is next to a river that overflows and floods the machine room. The following steps are an exemplary method for recovering from the disaster. A system administrator may log into the backup node 105 (from home or any available location) and begin the process of establishing a cloud-based failover, such as the virtual office 210. Utilizing various graphical user interfaces, which will be described in greater detail herein, the systems administrator may configure the characteristics of the virtual office 210.

According to some embodiments, an IP address for a cloud-based gateway VM 235 of the virtual office 210 may be set to 10.3.3.1 to match the IP address of the gateway server 230 of the actual office 205. For security purposes, the system administrator may desire secure access to the virtual office 210, to configure a VPN for the virtual office 210 and establish access credentials for at least a portion of the employees of the actual office 205.

In some instances, the system administrator may establish port forwarding for the standard web ports for the servers of the virtual office, although any types of ports may likewise be utilized in accordance with the present technology. For example, the system administrator may map exemplary external ports such as 80 and 443, on one or more allocated internet accessible IP addresses, to the internal ports 8000 and 8443 on the cloud-based exchange server VM 240. Similarly, an active directory server VM 250 and a share point server 245 may also be configured to communicatively couple with the cloud-based gateway VM 235. Once exemplary ports have been forwarded to the necessary servers within the virtual office 210, the system administrator may then start a cloud-based VM for each of the servers. It will be understood that the port forwarding rules can be created at anytime before or after the VMs have been started. Once the VMs have been started, the employees can now work from home and access the virtual office 210 while the flood damage is being repaired.

Following on with the example, three weeks later the location of the actual office 205 is repaired and ready for use. While the cloud server VMs continue to run, the system administrator may begin repairing or replacing damaged hardware such as the physical servers or the failover appliance(s). In the case of failover appliances, the failover appliances may be seeded with data from the intermediary node (or the backup node), such as snapshots and incremental files. Once the replacement appliance(s) has been installed, the replacement appliance(s) may then communicatively couple with the intermediary node or backup node via the Internet, where a synchronization of data occurs. The synchronization provides the latest version of snapshot and incremental files for the VMs running within the virtual office 210. The cloud-based VM servers may then be shut down such that the failover appliance(s) may resume the primary role. Finally, a bare metal restore may be performed for each replacement server to complete the physical recovery of the actual office 205.

More specifically, the management of a cloud-based failover (e.g., virtual office) may include the steps of starting a virtual office in a cloud-based backup system. The starting of the virtual office may comprise executing a test failover (virtual office), in either an automatically on a scheduled basis, or manually, to verify that the virtual office is operational. Once the test is completed and the virtual office is determined to be operational, the system administrator may then start a production failover when a site disaster occurs (e.g., upon the occurrence of a failover event). It will be understood that an administrator can start a production failover without first creating a test failover.

Once initiated, the virtual office may be configured by specifying details, such as Network Configuration, VPN, DHCP, and port forwarding, each of which will be described in greater detail below. Once properly configured, the system administrator may start server VMs in the virtual office and then monitor the status of the server VMs. In some instances, system administrators may manage individual server VMs and even terminate operation of the cloud-based virtual office. The termination of a cloud-based virtual office may comprise the discarding of a test failover and/or a migration of a production failover to a new local failover appliance.

Figure 3:
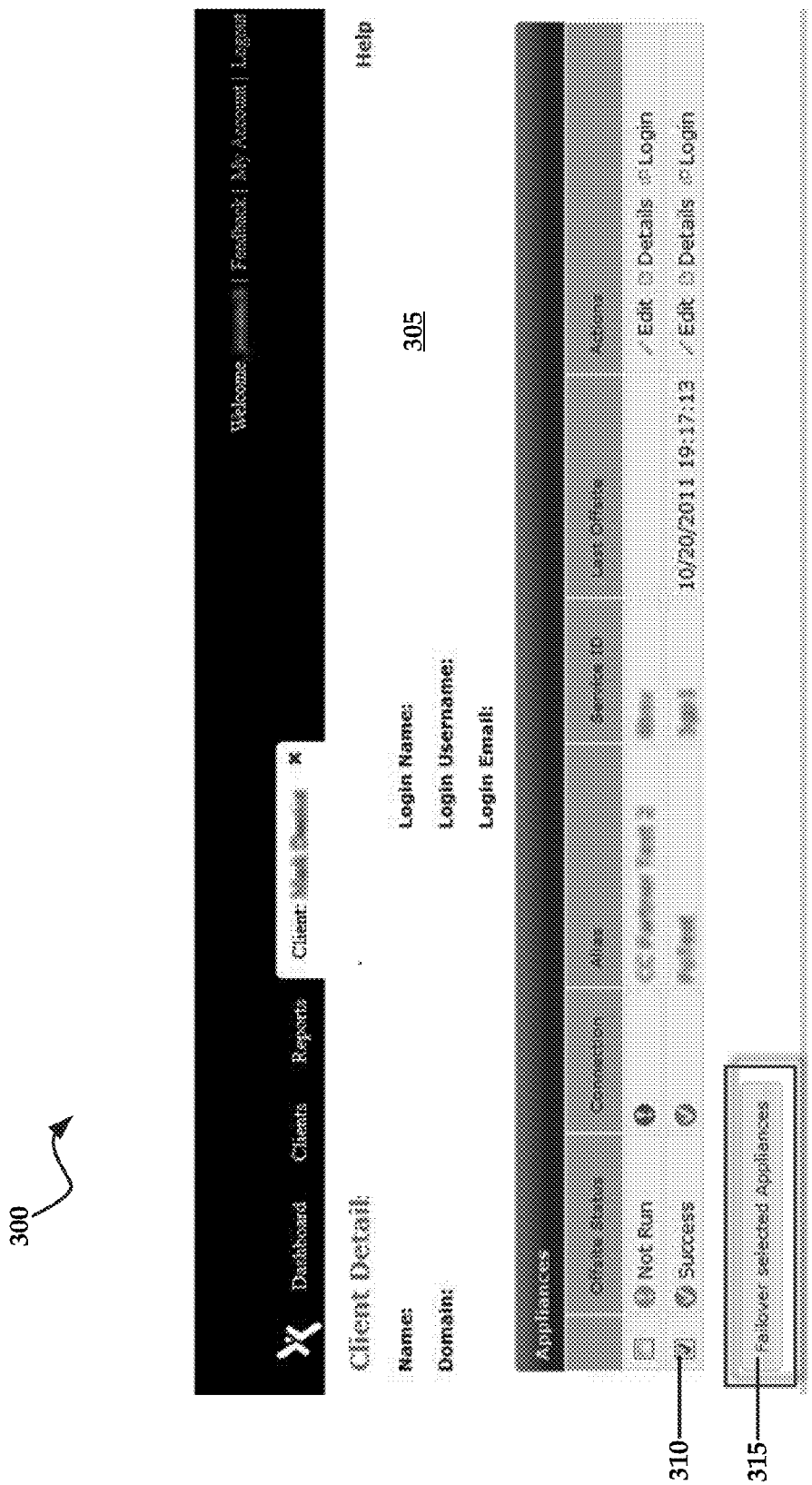
FIG. 3 is an exemplary user interface in the form of a management console interface that includes a failover launch button.
Figure 4:
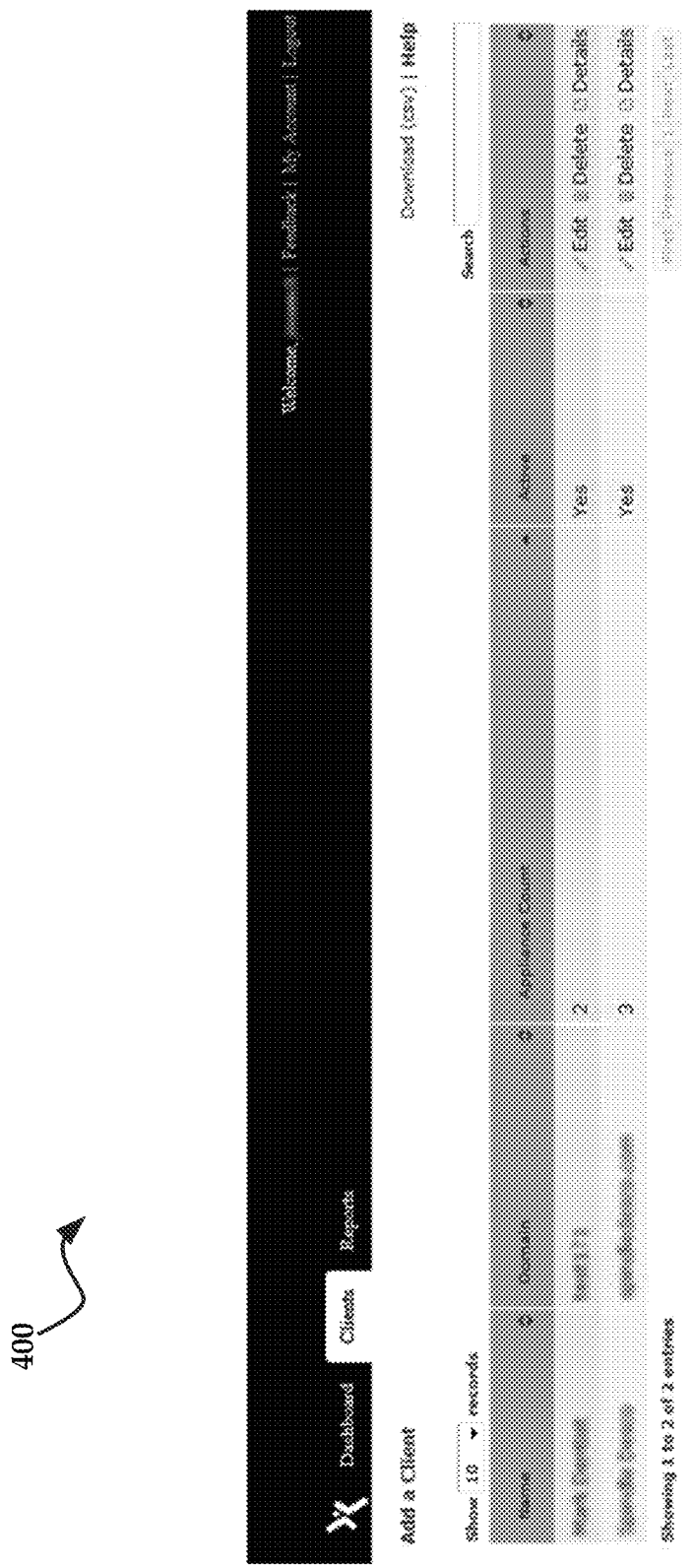
FIG. 4 is an exemplary user interface in the form of a client interface that lists clients with failover appliances.

FIG. 3 illustrates an exemplary user interface in the form of a web based management console (MC) interface, hereinafter "detail interface 300" for starting a virtual office. To start a virtual office the system administrator may log into the MC and follow either of the following sets of step(s). First, in a dashboard method, the system administrator may select a target appliance and choose the Failover option from the pull-down list in the Actions column. It is noteworthy that if the system administrator desires to failover multiple appliances, the system administrator may utilize what is referred to as the "clients" method. The system administrator may click clients' tab 305 to display a client's interface 400 (see FIG. 4). The system administrator may select a target client and choose the Details option from the pull-down list in the Actions column.

The detail interface 300 for that client may then be displayed. The system administrator may check a box 310 for the target appliance and then click the Failover Selected Appliances button 315.

Figure 5:
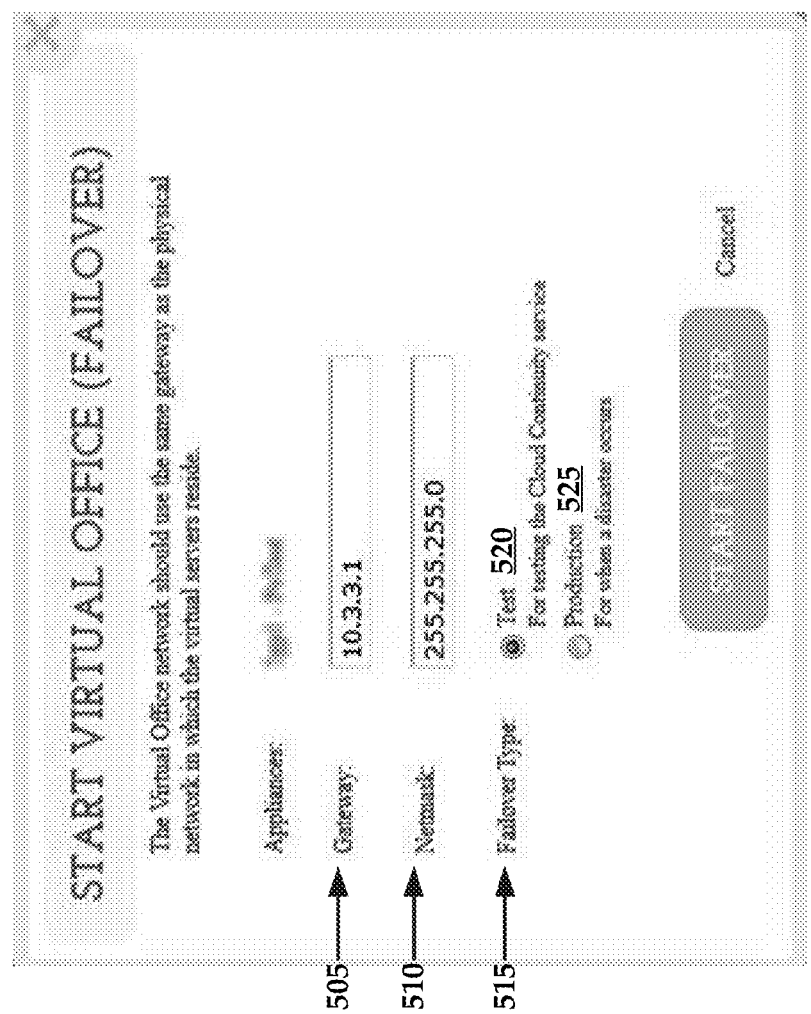
FIG. 5 is an exemplary cloud failover start window.

FIG. 5 illustrates an exemplary cloud failover start window 500. Once the Failover Selected Appliances button 315 of FIG. 3 has been activated, the cloud failover start window 500 is displayed. The system administrator may then utilize the cloud failover start window 500 to establish Gateway information 505 such as the gateway IP address for the cloud gateway of the virtual office. According to some embodiments, if known, the gateway IP and netmask may be pre-populated based on data obtained from the appliance. Additionally, the system administrator may establish Netmask information 510 and Failover Type information 515. The Failover Type information 515 allows the system administrator to select either Test or Production options. The test option 520 allows for the creation of a test environment. A test virtual office functions as a "sandbox" failover environment that may not be backed up. System administrators may use this feature to test whether the virtual office works as desired. It will be understood that a test failover may be isolated from normal network operations. For example, onsite and offsite back up jobs may continue normally while a test failover is active. In a test failover, accumulated configuration and data changes/additions within the VMs may be lost when the VMs are stopped.

The Failover type of Production may be selected to create a complete cloud failover environment (e.g., virtual office, virtual cloud-based VM). It is noteworthy that in some instances the cloud failover may comprise a plurality of virtualized machines in an office or in some instances the cloud failover may only comprise a single computing system such as a desktop computer or a laptop computer.

The Production 525 failover may be backed up while running and may be used to repopulate a replacement failover appliance (when ready). The Production 525 failover may be used as an interim solution during a disaster. For example, a virtual office may be utilized until the physical site is once again operational (e.g., servers are replaced or repaired).

A "Start Virtual Office" message box may appear as the virtual office is configured. After the virtual office environment set up is completed, the client detail interface reappears with a new virtual office display 600 (see FIG. 6A). This indicates the cloud failover environment is now set up and ready. At this point the system administrator can configure various network options (e.g., VPN, DHCP, and port forwarding) for the virtual office, as will be discussed in greater detail below.

To configure virtual office network settings, or VLAN, the system administrator may utilize a section 605 positioned on the left side of the new virtual office display 600. According to some embodiments, the section 605 may include a plurality of tabs that allow for configuration of the virtual office. In some instances the section 605 may comprise a "What's Next?" textual content section that provides a brief description of configuration (and start) options, and provides a navigation mechanism to each configuration section. A Network Settings tab 610 (FIG. 6A) may display the gateway and netmask settings for the virtual office. A VPN Settings tab 625 may display the current VPN settings (disabled by default) for the virtual office. A Port Forwarding Settings tab 615 may be utilized to display current port forwarding settings (disabled by default) for the virtual office. A DHCP Settings tab 620 may be utilized to display current DHCP settings (disabled by default) for the virtual office. A Site to Site VPN Settings tab 635 (FIG. 6B) may be utilized to display current settings for a local site-to-site VPN (disabled by default). The functionalities attributed to each of these tabs will be discussed in greater detail below with regard to FIG. 6B which includes a larger view of the section 605.

According to some embodiments, the gateway and netmask settings may be automatically configured when the cloud failover is started. However, the system administrator can change those settings at any time. Clicking the Network Settings tab 610 of FIG. 6A causes the display of a Cloud Network Settings interface 700 of FIG. 7. To edit the network settings of the interface 700 the system administrator may click on the Network Settings section and then enter a new value for one or more of the following fields: Gateway 705, where a new gateway IP address may be entered; Netmask 710, wherein a new netmask value may be entered; and VNC IP 715 (optional), where an IP address(es) for VNC clients may be entered, which can be any available (unused) IP address for the virtual office. Normally, VNC clients can use the virtual office gateway address, such that separate IP addresses may not be necessary. However, VNC clients may not be able to use the initial virtual office gateway address when testing a cloud failover while the original gateway is still active (a common situation when testing from the actual office). This is due to the fact that the VNC client will default to the original gateway device instead of the virtual office. This field allows the system administrator to specify an alternate IP address that avoids this problem.

Additionally, the Network Settings section may comprise Internet Connectivity 720 (optional). This option may enable outbound access to the Internet by the VMs of the virtual network. It is noteworthy that enabling Internet connectivity may allow both outbound and inbound messages between external devices and the server VMs in the virtual office. Conversely, disabling Internet connectivity allows only inbound (not outbound) messages from external devices. This means that server VMs within the virtual office can communicate with each other and external traffic can be received (if port forwarding is enabled), but the server VMs may not be allowed to send messages outside the virtual office.

Figure 6A:
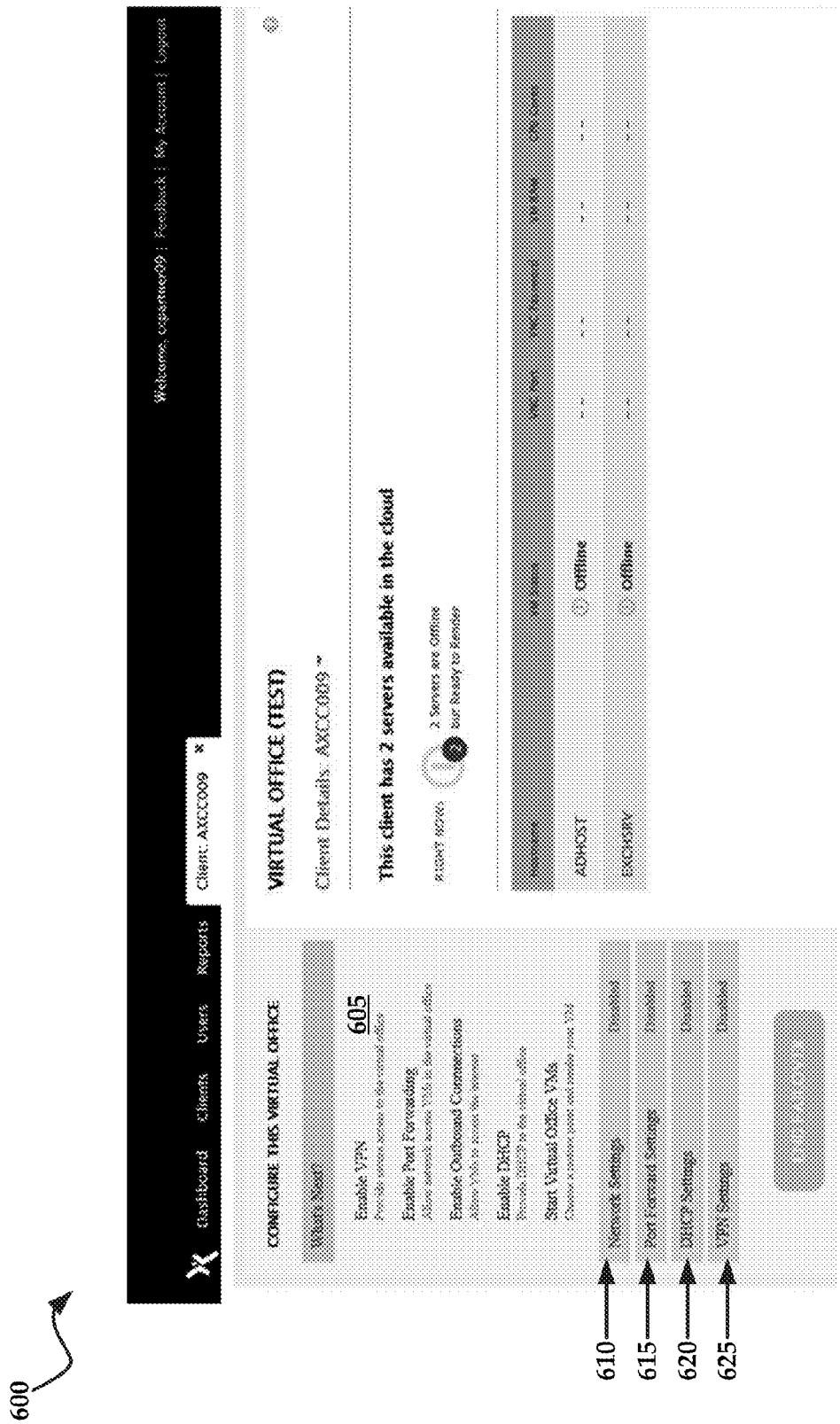
FIG. 6A is an exemplary new virtual office display interface.
Figure 7:
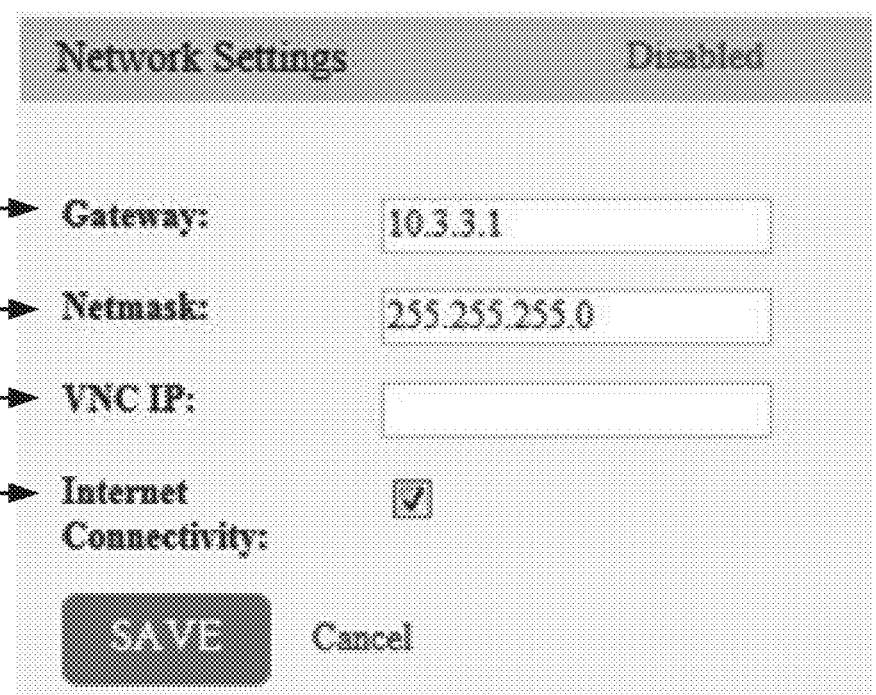
FIG. 7 is an exemplary network settings interface that allows for specification of gateway, netmask information, and VNC IP information for the cloud-based virtual office.
Figures 8A, 8B:
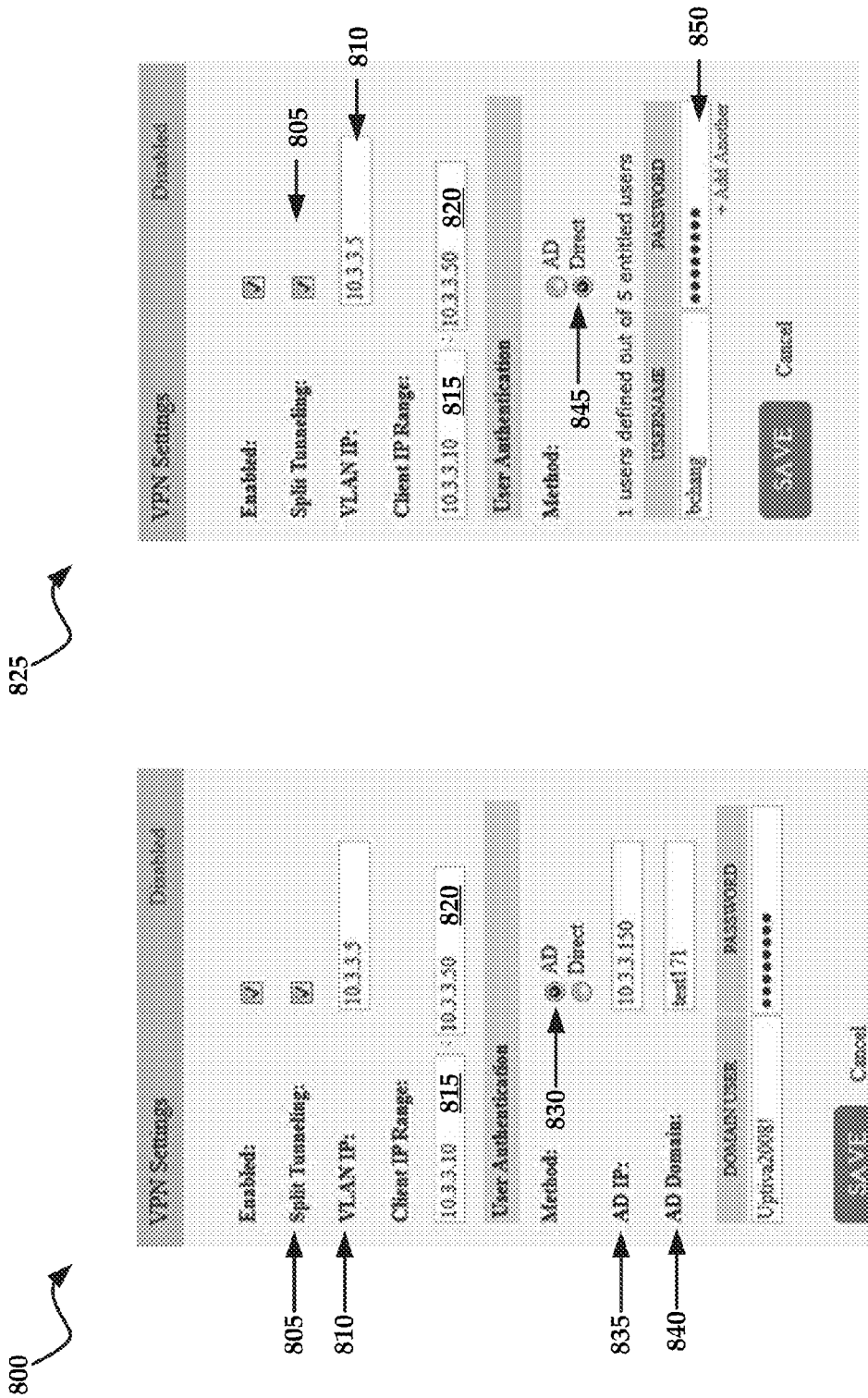
FIGS. 8A and 8B are exemplary interfaces that allow for the input of VPN settings for the cloud-based virtual office.

Clicking the VPN Settings tab 615 of FIG. 6A displays VPN Setting interface 800 of FIG. 8A, which allows the system administrator to enable split tunneling by checking split tunneling box 805. Split tunneling allows VPN users to access the Internet and the virtual office LAN at the same time using the same network connection. A VLAN IP may be established by entering an IP address for the virtual LAN in a LAN IP text input box 810. It is noteworthy that this is the IP address that may be assigned to a virtual network interface inside the virtual office. Conceptually, this IP address may comprise the IP address on the VLAN that has been assigned to the VPN server. For example, in a physical office network this is the internal IP address of the VPN server.

A Client IP Range may be established by entering a range (beginning and ending values) of available IP addresses within boxes 815 and 820. This is a range of private IP addresses, on the VLAN within the virtual office, that are assigned to the VPN end users once they are connected through the VPN. For example, in a physical office network, this can be a range of IP addresses dedicated to user workstations.

According to some embodiments, user authentication may be set directly via VPN Settings interface 825 of FIG. 8B. Alternatively, to set user authentication through Active Directory, VPN Settings interface 800 of FIG. 8A may be utilized by first clicking AD button 830. Next, the system administrator may enter the IP address of an Active Directory server present within the virtual office into AD IP box 835 and a domain name for the Active Directory server in AD Domain box 840. Next, an Active Directory Domain user name and password may be input in the appropriate fields that allows the VPN server to access the Active Directory within the virtual office for the purposes of verifying a user's username and password combination.

To set user authentication directly via the VPN Settings interface 825 of FIG. 8B, the system administrator may click the Direct button 845 and enter a username and password in the appropriate fields. If there are multiple users, click the Add Another button 850 and repeat this step as many times as necessary. The number of VPN users may be capped by service subscription entitlement limitations.

It will be understood that the VLAN and client range IP addresses may be private IP addresses from the cloud failover network (as defined by the gateway address and network mask) that do not overlap with IP addresses of server VMs that are specified to start in the cloud, or any other allocated IP addresses within the virtual office, for example DHCP IP address range, VNC IP address, gateway IP. This avoids potential IP address conflict, and as mentioned above, the addresses can be changed later if necessary or desired. The system validates that the entered IP address range does not overlap or conflict with any other IP addresses within the virtual office.

By way of non-limiting example, consider an example where the gateway IP address is 192.168.77.1, the netmask is 255.255.255.0, and the servers in the physical office had IP addresses in the range 192.168.77.2 through 192.168.77.10. The VNC IP is set to 192.168.77.254, and the DHCP service is assigned to 192.168.77.200 with a DHCP Client Range: 192.168.77.201-192.168.77.253. To prevent a conflict with these addresses, enter the following values: VPN VLAN IP: 192.168.77.11 (the next available address) in LAN IP box 810 and VPN Client IP Range: 192.168.77.12-192.168.77.199 (all remaining available addresses in boxes 815 and 820, respectively.

Figure 9:
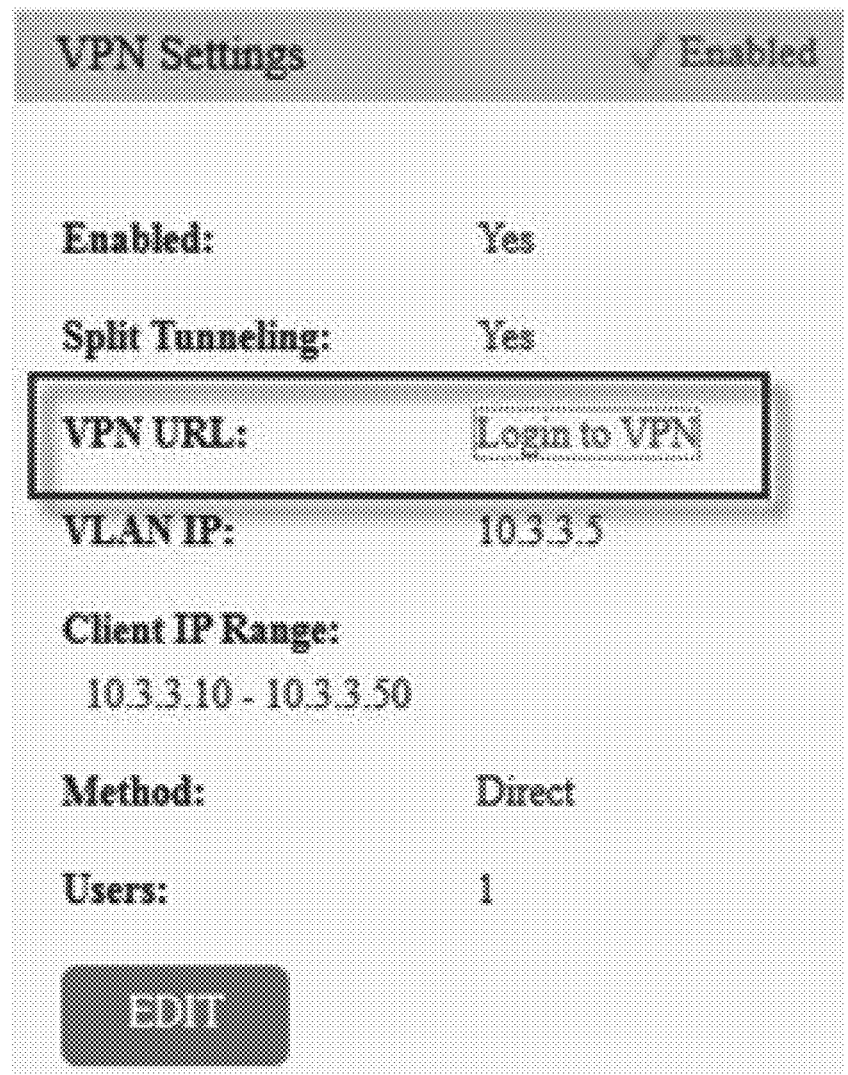
FIG. 9 is an exemplary interface that allows individuals to login to the VPN that has been established for the cloud-based virtual office.
Figure 10:
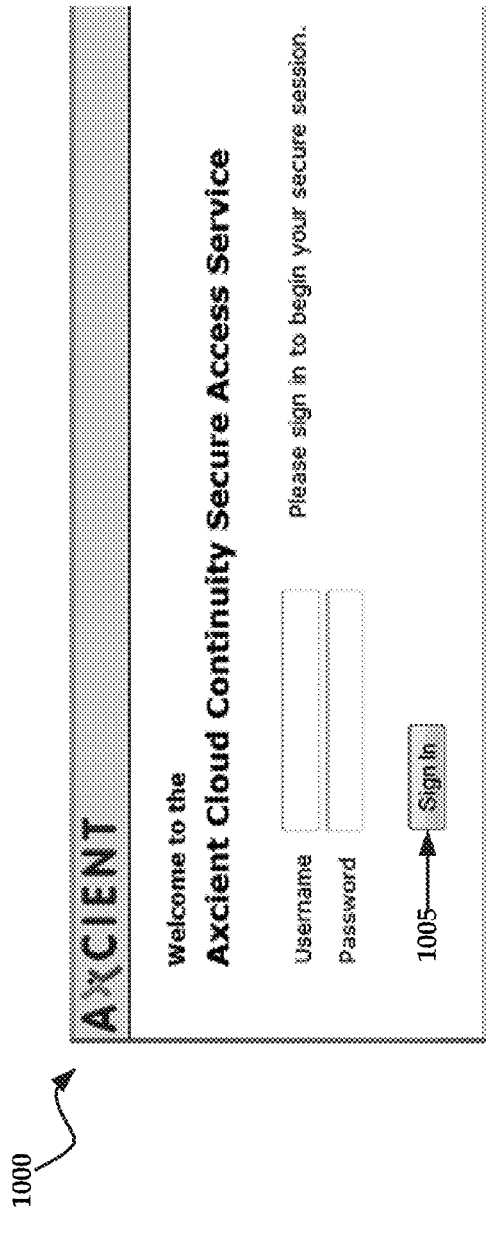
FIGS. 10 and 11 are exemplary interfaces that allow end users to login to the cloud-based virtual office.
Figure 11:
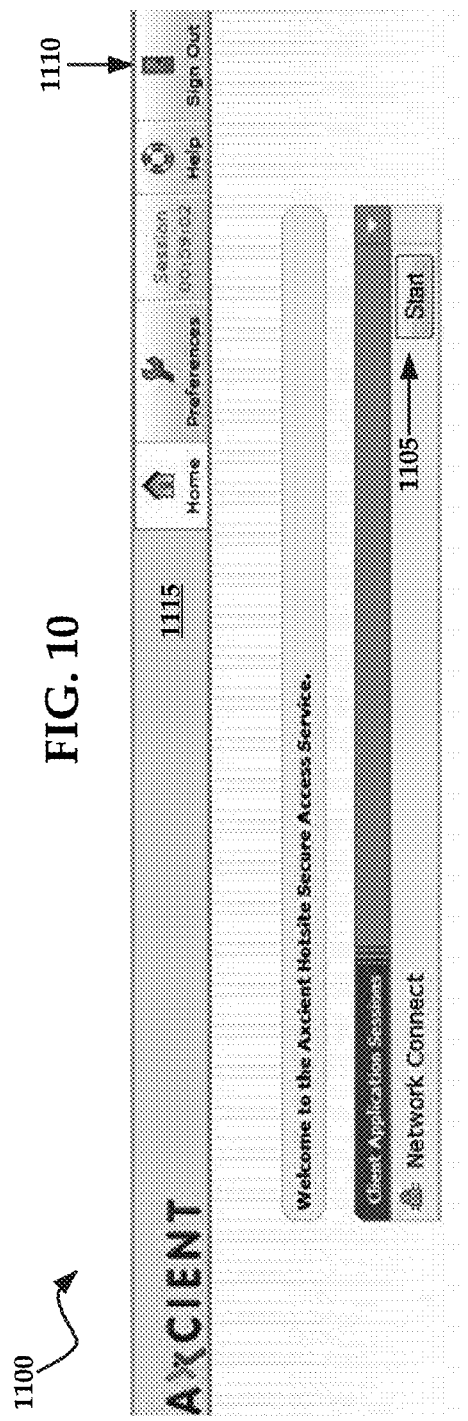

Turning to FIG. 9, FIG. 9 shows an exemplary interface that allows individuals to download the VPN client software, which allows individuals to login to the VPN that has been established for the cloud-based virtual office. After VPN is enabled, a Cloud VPN Login Interface 1000 of FIG. 10 is displayed. VPN clients may utilize this interface 1000 to enter their appropriate authentication credentials such as a username and/or password. Upon clicking Sign In button 1005, a Cloud VPN Client Session Interface 1100 of FIG. 11 may be displayed. The Cloud VPN Client Session Interface 1100 may comprise a Network Start button 1105. VPN clients may sign out of their VPN session using the Sign Out Icon 1110 located in a toolbar 1115 of FIG. 11, which also comprise other buttons that launch features such as Preferences, Help, and Home.

Figure 6B:
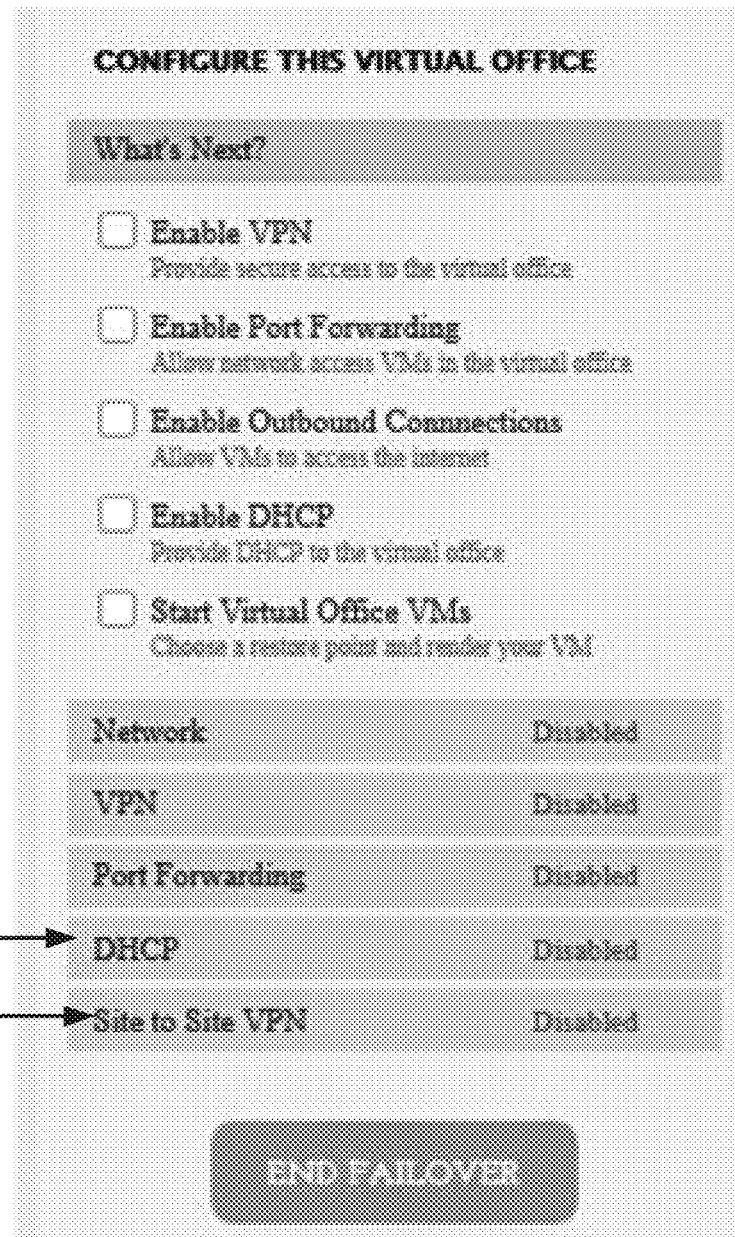
FIG. 6B is a section of the interface of FIG. 6A that includes various virtual office settings tabs used to configure the cloud-based virtual office.
Figure 12:
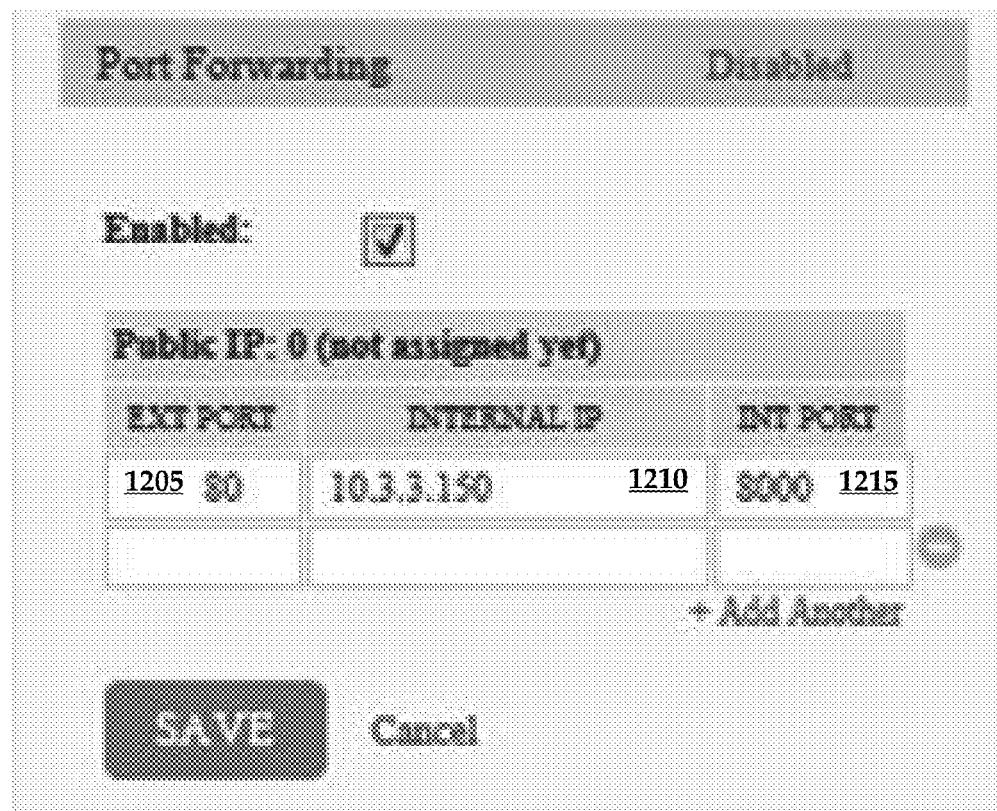
FIG. 12 is an exemplary interface that allows for specification of port forwarding information for the cloud-based virtual office.

According to some embodiments, the system administrator may specify Port Forwarding Settings for the virtual office by selecting the Port Forwarding Settings tab 605 of FIG. 6B to display a Cloud Port Forwarding Settings interface 1200 as shown in FIG. 12. Generally speaking, port forwarding may not be enabled by default, but the system administrator may configure port forwarding to work in the cloud-based virtual office. The system administrator may input appropriate mapping values into the interface 1200. More specifically, the interface 1200 may display the public IP address allocated by the system and three optional blank fields. These blank fields may comprise EXT PORT 1205 where the system administrator may enter an external port number, an INTERNAL IP 1210 where the system administrator may enter an IP address of a VM that exists within the virtual office vlan, as well as an INT PORT 1215 where the system administrator may enter an internal port number. Additional entries may be included by clicking an "Add Another" link and inputting the desired information. According to some embodiments, after port forwarding is enabled, the externally mapped IP address appears as part of the port forward configuration display. Multiple public IP addresses may be assigned to a virtual office. The number assigned is driven by the entitlements associated with the client's service subscription. Each allocated public IP address may have its own set of port forwarding rules.

Figure 13:
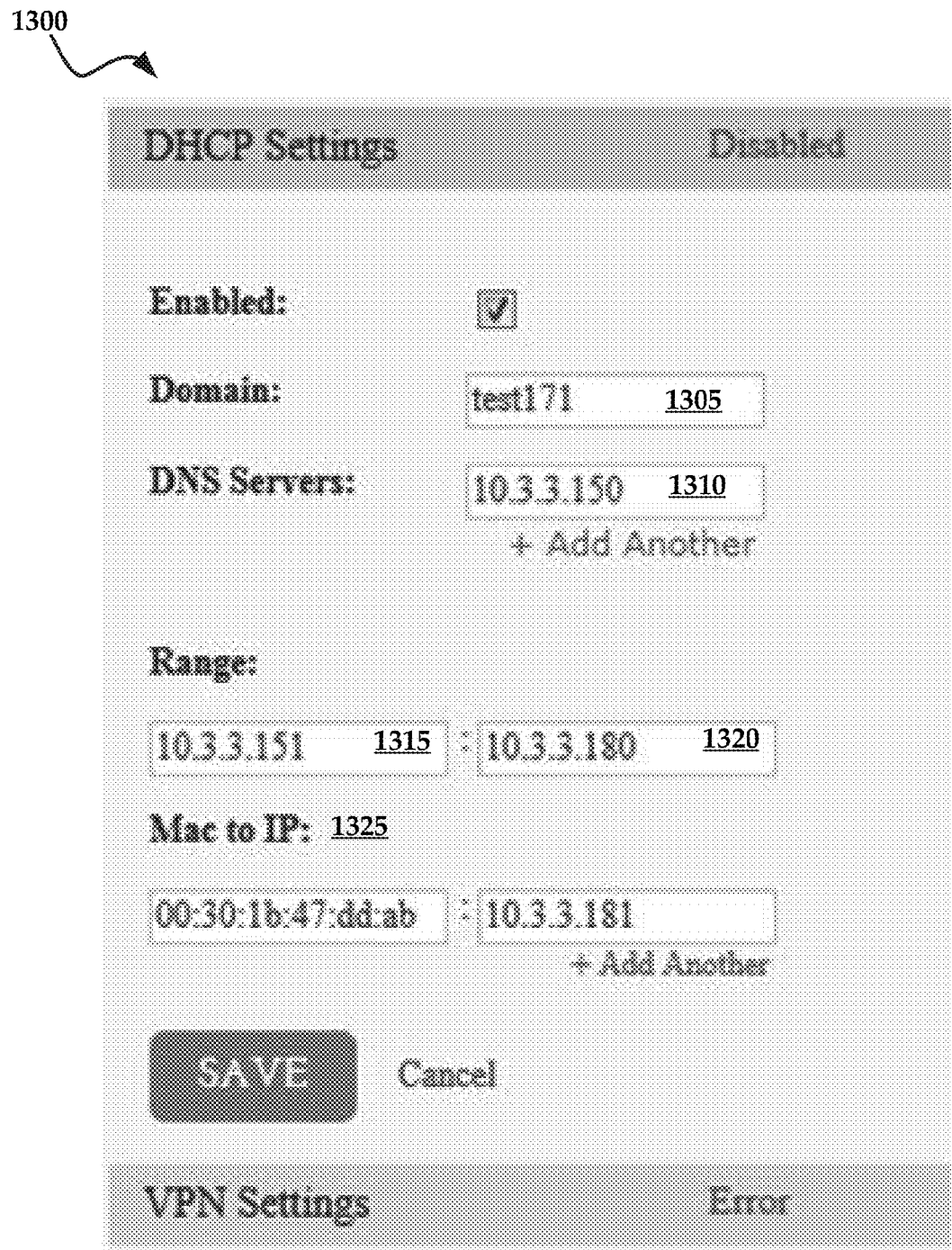
FIG. 13 is an exemplary interface that allows for specification of dynamic host configuration protocol information for the cloud-based virtual office.

The system administrator may then enable DHCP settings for the cloud-based virtual office. As mentioned above, DHCP settings, by default, may not be automatically established for the cloud-based virtual office. Therefore, the system administrator may utilize the DHCP settings tab 630 of FIG. 6B to display a Cloud DHCP Settings interface 1300 of FIG. 13 which allows the system administrator to specify DHCP settings for the cloud-based virtual office.

In some instances, to configure or edit the DHCP settings for the cloud-based virtual office, the system administrator select an "Enabled" box if it is not already checked. The system administrator may then enter a domain name in the Domain field 1305 and a host name or IP address for the DNS server in the DNS Server field 1310. If there are multiple DNS servers, the system administrator may select the "Add Another" button and repeat the data input steps regarding the DNS IP address fields many times as necessary.

Next, the system administrator may then enter a range of IP addresses that can be used by cloud-based virtual office in the Range fields 1315 and 1320, as well as assign an IP address to a server by entering a MAC address in the Mac to IP field 1325. Again, if there are multiple computing devices that require IP addresses assigned based on their MAC address, the system administrator may click the "Add Another" button and repeat this step as many times as necessary. It will be understood that DHCP may assign IP addresses to any servers not specified in this field. Validation checks may be made against the input IP addresses to insure that they do not conflict with the IP addresses already configured for the virtual office.

Figures 14, 15:
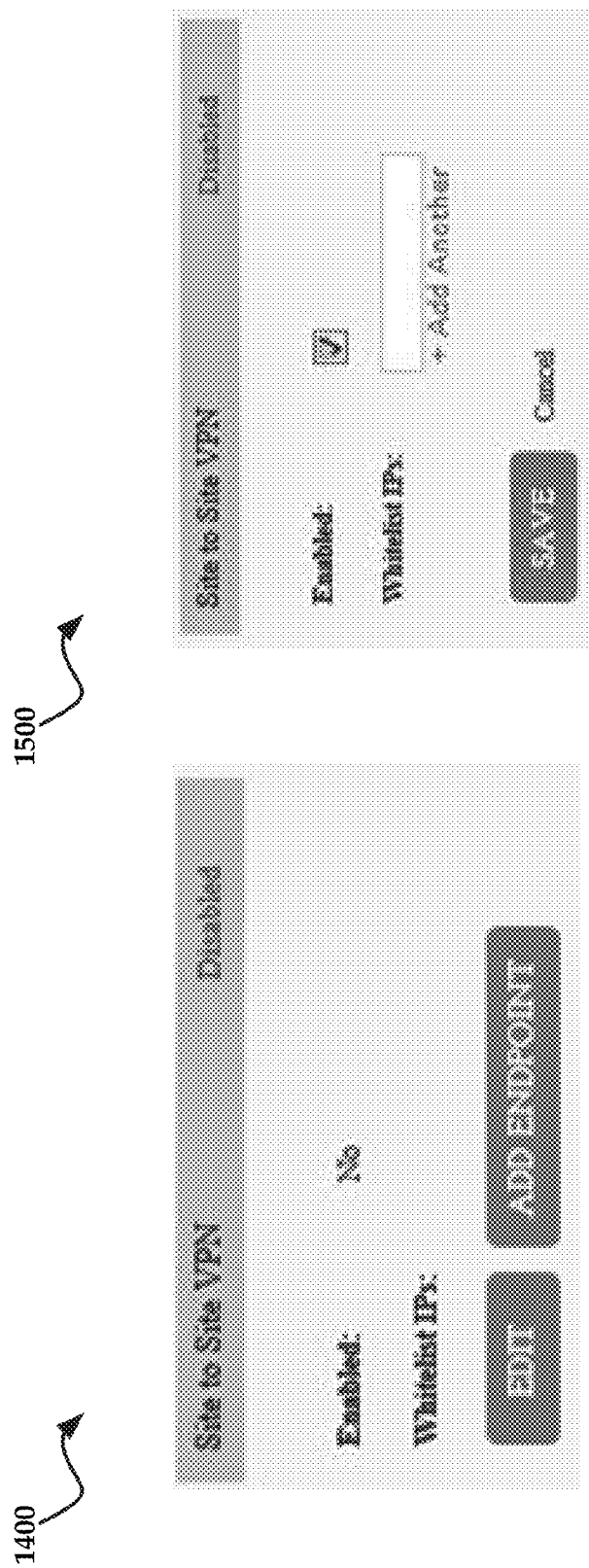
FIGS. 14 and 15 are exemplary interfaces that allow for the specification of site-to-site VPN information for the cloud-based virtual office.

In accordance with the present disclosure, the system administrator may also establish site-to-site VPN settings by clicking the Site to Site VPN Settings tab 635 of FIG. 6B to launch a Cloud Site-to-Site VPN interface 1400 of FIG. 14.

In addition to the standard VPN set up, the system administrator can also set up a VPN connection between two or more remote sites. More specifically, while the standard set up configures VPN for individual devices to connect to the cloud-based virtual office, site-to-site VPN allows the system administrator to create a single VPN end point within the local network through which any local user can connect to the cloud-based virtual office.

In some instances, a virtual image (end point) may be downloaded onto a VM system in the cloud-based virtual office and then running the virtual image from that system. A site-to-site VPN may be utilized during a site disaster and can provide valuable services in the following situations. For example, when a site disaster occurs in an organization with two (or more) sites linked together in a corporate network, a site-to-site VPN connection can be configured that effectively recreates the corporate network for the unavailable physical site. In other instances, when a site is being rebuilt after a disaster, a site-to-site VPN may allow users to physically utilize the site while the machine room is still under repair. Thus, the site-to-site VPN connection can be configured as a replacement while the machine room and servers are rebuilt.

The Cloud Site-to-Site VPN interface 1400 of FIG. 14 may be utilized to set up site-to-site VPN by setting up a system in the network that will run the virtual image (VPN end point). Upon clicking the Edit button 1400 of FIG. 14, an Edit interface 1500 of FIG. 15 may be displayed. The Edit interface 1500 allows the system administrator to enable site-to-site VPN, restrict access to the cloud-based virtual office by inputting a WhiteList of IP addresses.

Figure 17:
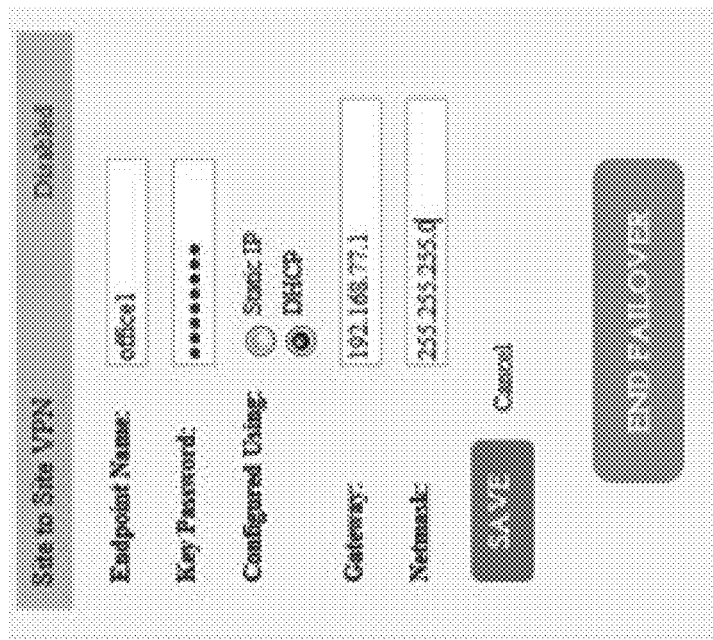
FIGS. 16 and 17 are exemplary interfaces that allow for the specification of site-to-site VPN information for the cloud-based virtual office, where
Figure 16:
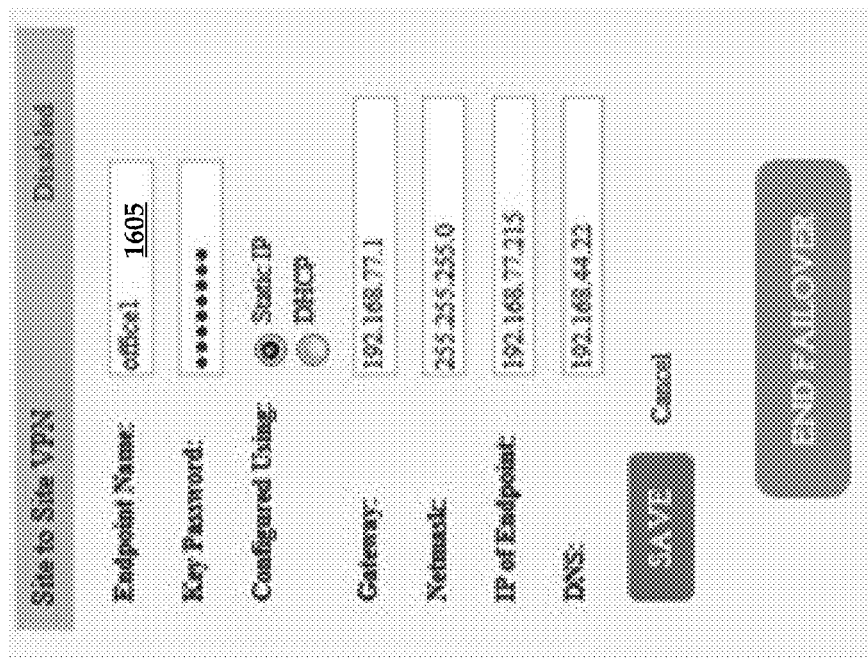

Next, the system administrator may click the "Add End Point" button of FIG. 1400 to display an Endpoint Setting interface 1600 of FIG. 16. The system administrator may input a name for the end point in End Point field 1605. This can be anything such as a descriptive name for the office (e.g., office1). Next the system administrator may optionally input a password for secure socket layer (SSL) authentication, an RSA key, or other authentication information. Users must enter that password when accessing the VPN. It will be understood that if this field is left blank, no password may be required, although server login credentials may still apply. The system administrator may also assign the target system a static IP address, or alternative utilize DHCP for automatic address assignment. Otherwise, the system administrator may input a gateway IP address, netmask value, an IP address of the Endpoint, and/or an IP address of a DNS server. To configure using DHCP, a gateway IP address and netmask values may be entered. FIG. 17 is an exemplary interface that allow for the specification of site-to-site VPN information for the cloud-based virtual office, and illustrates the establishing site-to-site VPN using a DHCP address assignment.

Figure 18:
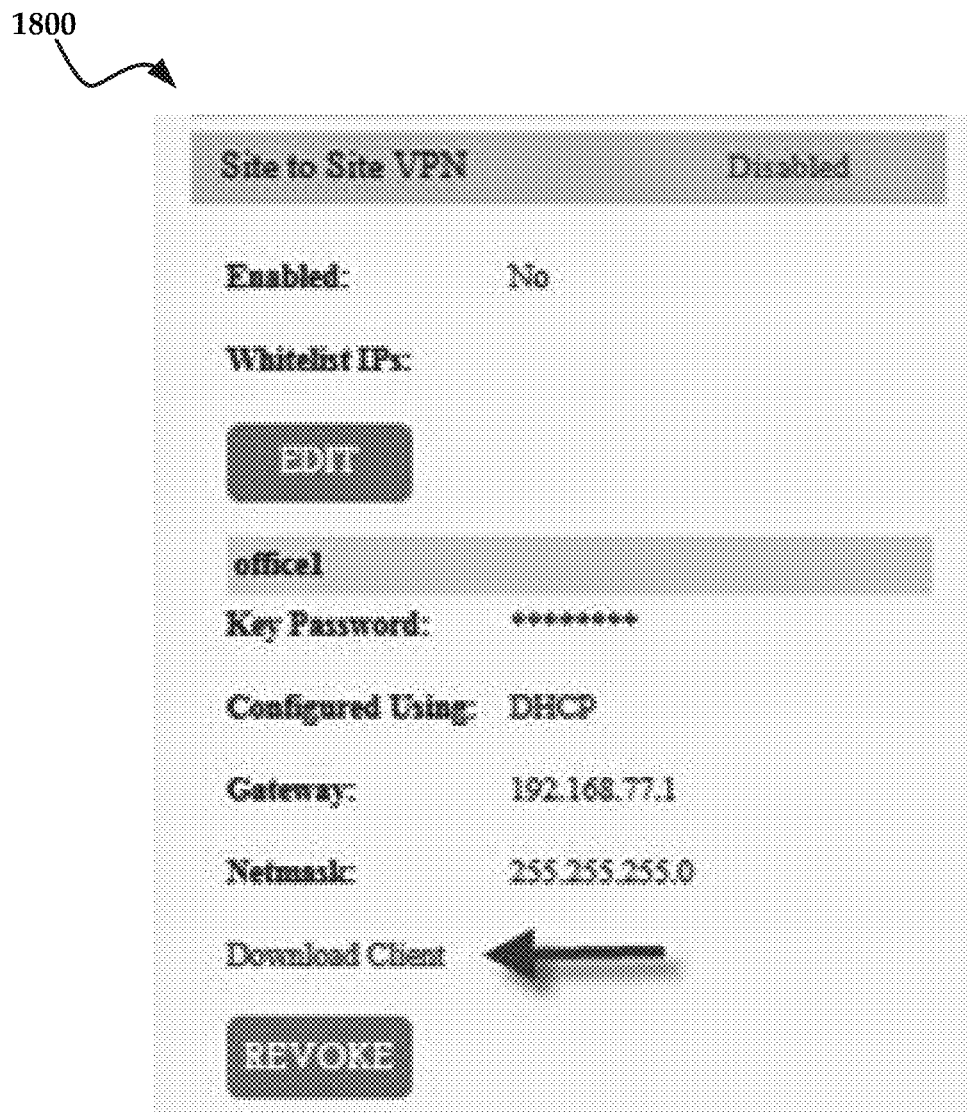
FIG. 18 is an exemplary interface that allows for the specification of further details regarding the establishment of a site-to-site VPN, where an end user may download a virtual image for the VPN client.

Next, a download client link may be selected to download the virtual image using the Download Client interface 1800 of FIG. 18. The system administrator may download the virtual image anywhere on the target system. The virtual image may or may not be compressed and/or encrypted. Continuing with the example above, the Endpoint name is "office1" so a zipped file is called vpn_endpoint-office1.zip may be selected and downloaded.

The system administrator may execute any type of program that is capable of running a virtual machine on their local machine. For example, the virtual image may be booted using a virtualization program before the address for the virtual machine can be added to the network routing table for the virtual office.

Figure 19:
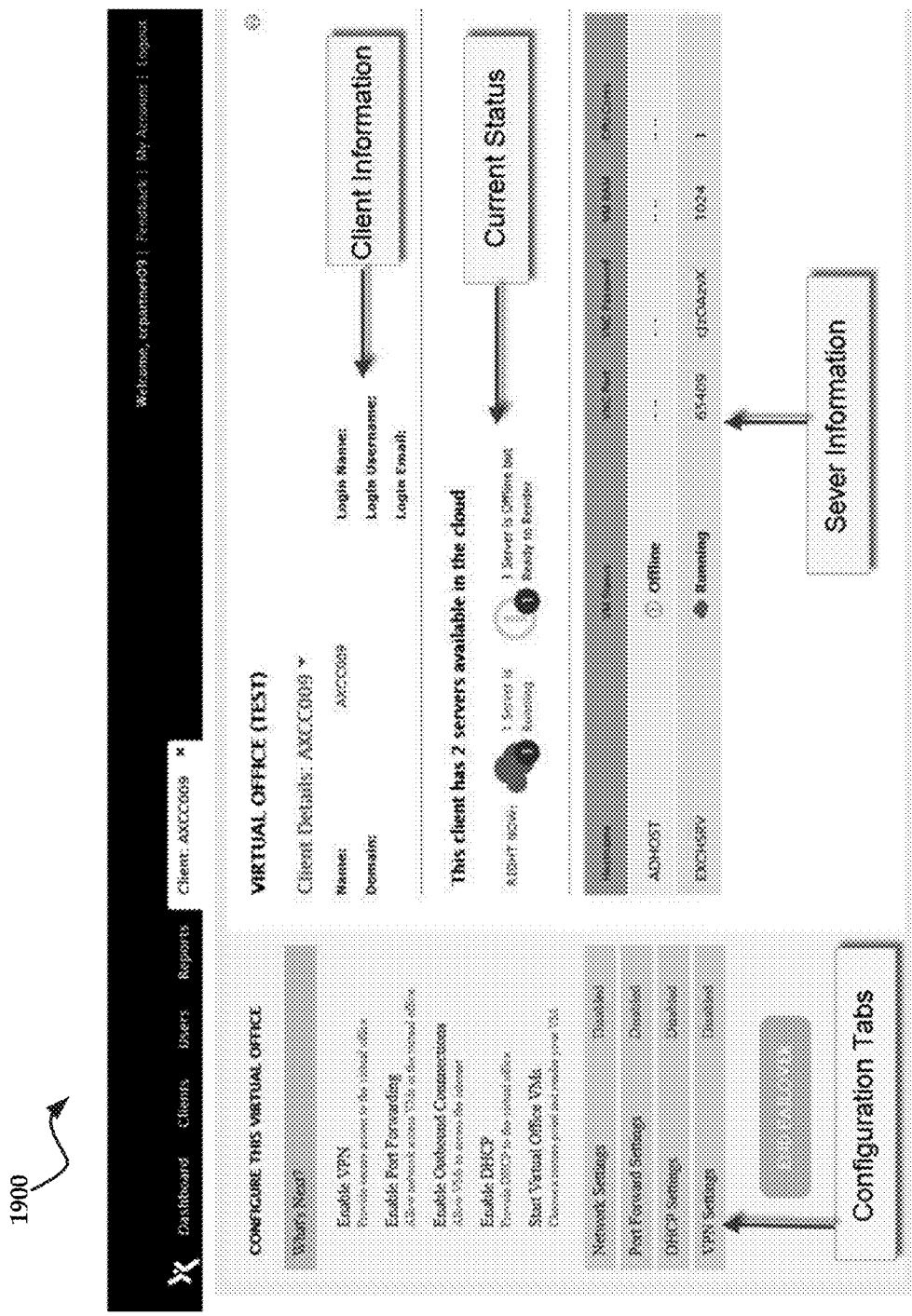
FIG. 19 is an exemplary client details interface that includes information about the cloud-based virtual office environment for a specific client.
Figure 20:
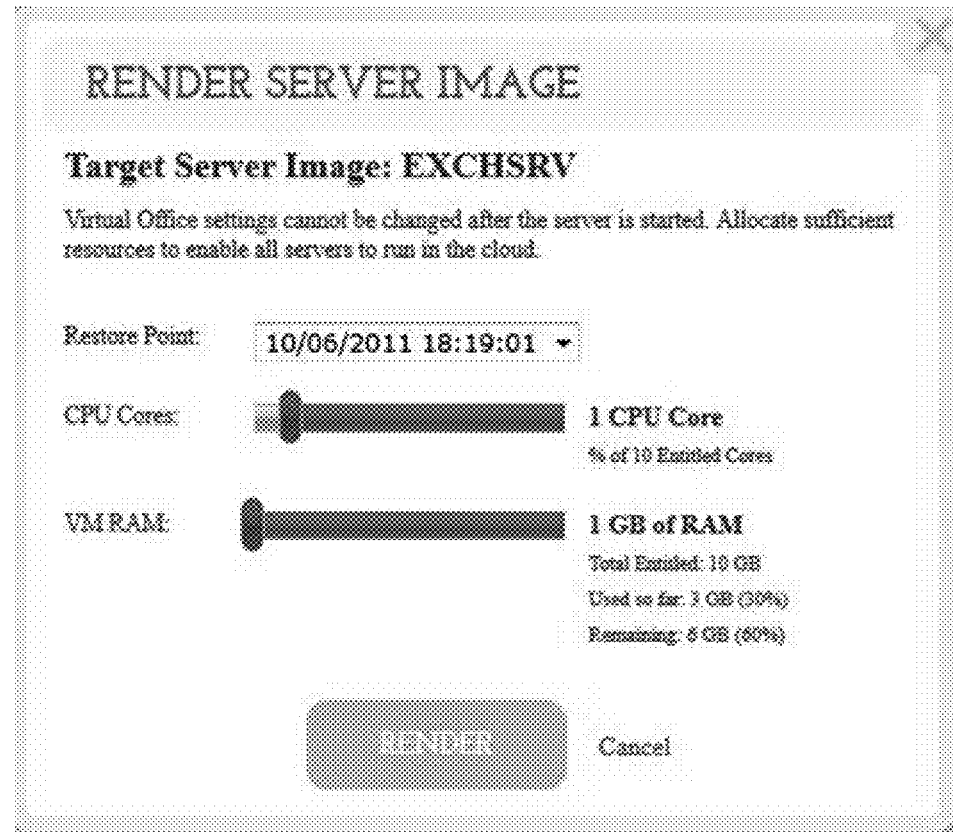
FIG. 20 is an exemplary interface that allows for the rendering of a server image to configure and launch a virtual server machine.

After the virtual office starts (see virtual office 210 of FIG. 2B), no server VMs are running initially. To start a server VM, the system administrator may utilize the Virtual Office Detail interface 1900 of FIG. 19, which includes configuration options on the left and server VM information on the right. The initial VM Status for all servers is offline. The system administrator may choose a server by click the down arrow at the end of the line and select Render from the pull-down list. A Render Server Image interface 2000 of FIG. 20 is displayed which allows the system administrator to select a server image backup (date and time) from a pull-down list. Additionally, the system administrator may select the number of CPU cores to use for this VM (e.g., by left-click of their mouse and moving the sliding bar to the desired number). The system administrator can allocate up to the maximum number of available (entitled and unused) cores for this VM server. In some instances, the system administrator may select an amount of memory to allocate to this VM (e.g., by left-click their mouse and moving the sliding bar to the desired number). In some embodiments, RAM memory may start at one gigabyte (GB) and can be increased in one GB increments up to the maximum available (entitled and unused) memory for this client. Finally, the clicking the Render button starts the rendering process.

It will be understood that input methods may not be limited to specific mouse clicks, and may comprise any pointer device primary click, including motion-based input, gestures, touch, and other inputs that would be common on mobile devices with touch screen inputs.

Referring back to FIG. 19, after the virtual office starts, the Virtual Office Detail interface 1900 may contain information about the cloud-based virtual office for that client. For example, the Virtual Office Detail interface 1900 may include Client Information. The top right section of the interface contains information about the client. Exemplary fields relative to client details are described in greater detail relative to FIGS. 21A-C.

Figure 22:
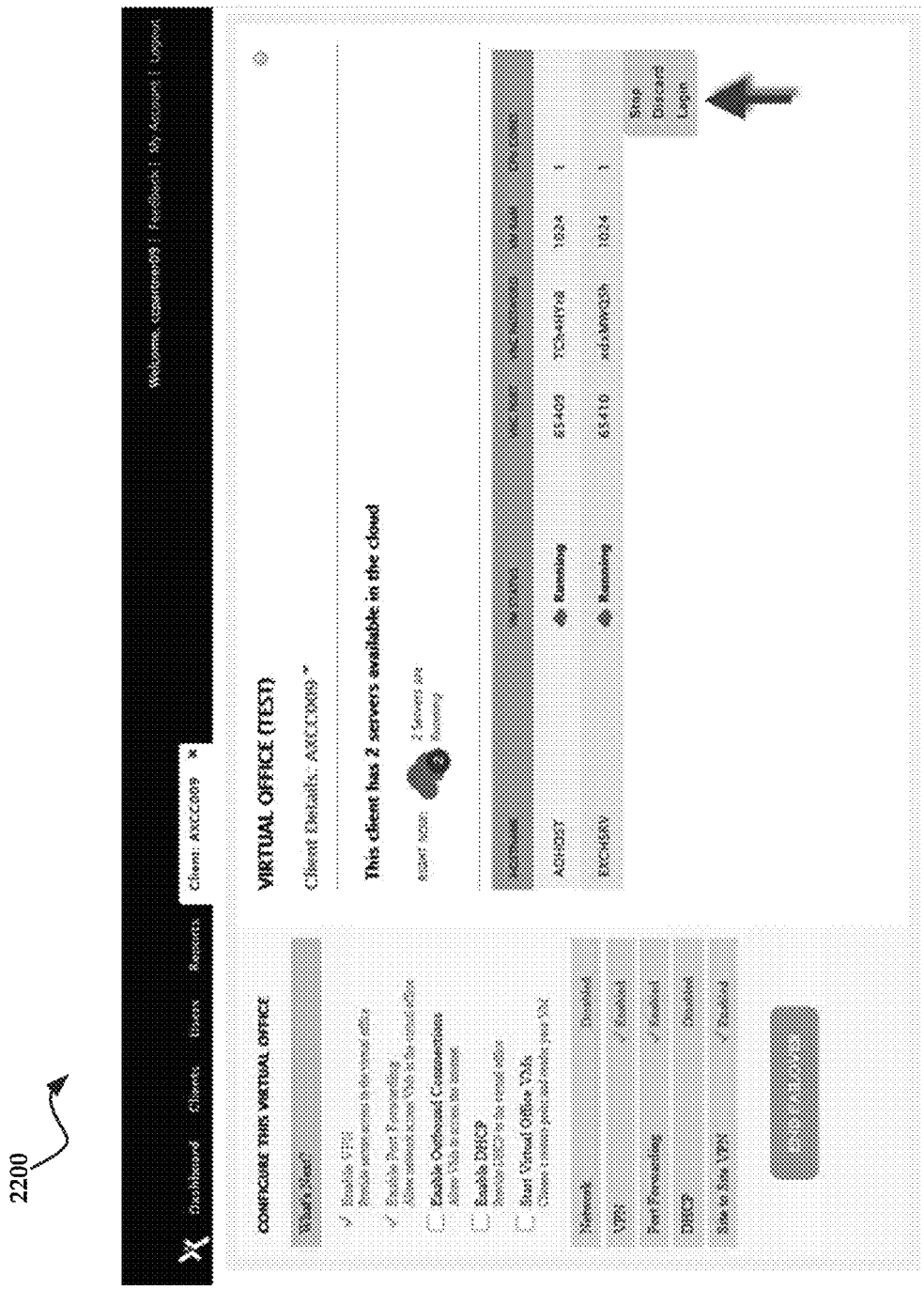
FIG. 22 is an exemplary client interface where a system administrator may select a target server and choose a desired action in the "Actions" column pull-down list.

Once a server VM has been rendered, the system administrator may manage the operation of the server VM using Running VM Options interface 2200 of FIG. 22. On the Running VM Options interface 2200, the system administrator may select a target server VM and choose a desired action in the "Actions" column pull-down list shown in FIG. 22.

To shutdown a server VM, the system administrator may select the Stop option. The VM Status may change to Ready when the shutdown is complete, such that the VM may be restarted at any time. To restart a previously shutdown server VM, the system administrator may select the Start option. It is noteworthy that the time it takes to start up the VM may depend on several factors including image version, size, load, and network traffic. According to some embodiments, if the VM does not successfully shutdown, the user can attempt to shutdown the VM again, where upon they are given the option to forcibly shutdown the VM.

Figure 23:
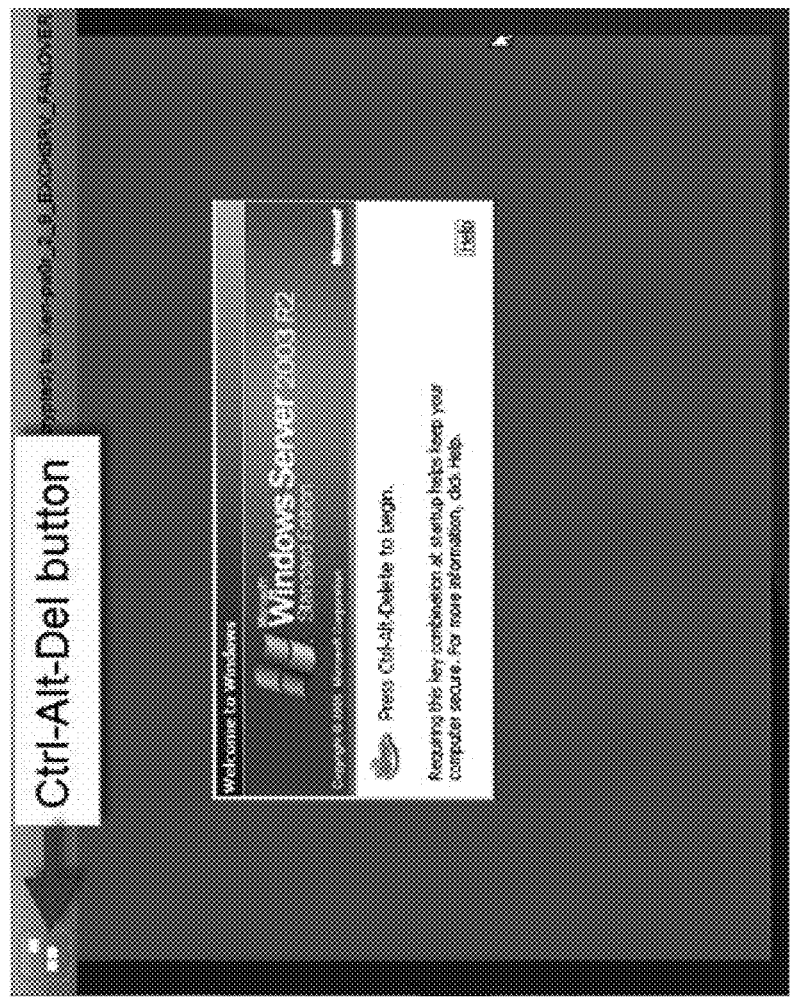
FIG. 23 is an exemplary VNC client interface.

To discard (e.g., delete the selected backup that was converted to a VM configured with the settings selected in the Render dialog) a server VM, the system administrator may select the Discard option. The VM must be rendered again to start a new server VM. To access the server VM, the system administrator may select the Login button. This opens a Virtual Network Computing (VNC) client window 2300 of FIG. 23. The system administrator may log into the server using appropriate credentials for that server. To proceed, the system administrator may click the button in the upper left to generate a Ctrl-Alt-Del sequence.

In addition to the built-in VNC client viewer, the system administrator can access a server VM through a separate VNC client viewer or through remote desktop. It is noteworthy that in some instances, to access a server VM through a remote desktop, it may be required that a VPN connection be established. In addition, a user session may be timed out after 30 minutes of inactivity.

If a remote desktop protocol (RDP), such as the Microsoft Remote Desktop Protocol, is enabled on the server running as a VM, the system administrator can access the VM by opening a Remote Desktop Connection Client. Enter the server IP address or host name using the built-in remote desktop functionality included in the Operating System of the local machine. VNC may be enabled by default, so the system administrator can access the VM by opening a VNC client viewer. Next, the system administrator may either enter the VNC IP address if it was set or the gateway IP address with the VNC port number that the system has allocated for the server VM (e.g., vncIP:port# or gatewayIP:port#). The port number and password to enter in the authentication window is displayed in the VNC Port and VNC Password columns for that server VM in the Client Details interface (see FIG. 19). Information appears in the VNC Port and VNC Password columns only when the VM is running; the columns are blank when the VM is in any other state. In some instances, these data may be moved to another pane on the screen. Specifically, the data may be moved to a summary pane that may be shown in the table beneath the row, with which the information corresponds.

It is noteworthy that the VNC is a remote control application that allows the system administrator to view and interact with one computer through a client "viewer" application on another computer anywhere on the Internet. The VNC is operating system independent, so the target and client computers can be of different types (for example, the VNC viewer on a Windows® system accessing a Linux® system). It will be understood that when starting any VNC viewer, to access the VM, consider the following requirements. For example, when the VM starts, it must initially adjust device drivers, including mouse and keyboard drivers. This normally is obvious when first connecting to the VM through a VNC client, as the VM might not respond to mouse or keyboard activity during this period. Additionally, it may be necessary to issue the Control-Alt-Delete keyboard sequence to login to the VM. Most VNC clients have a helper menu that is accessed through a function key.

Figure 24:
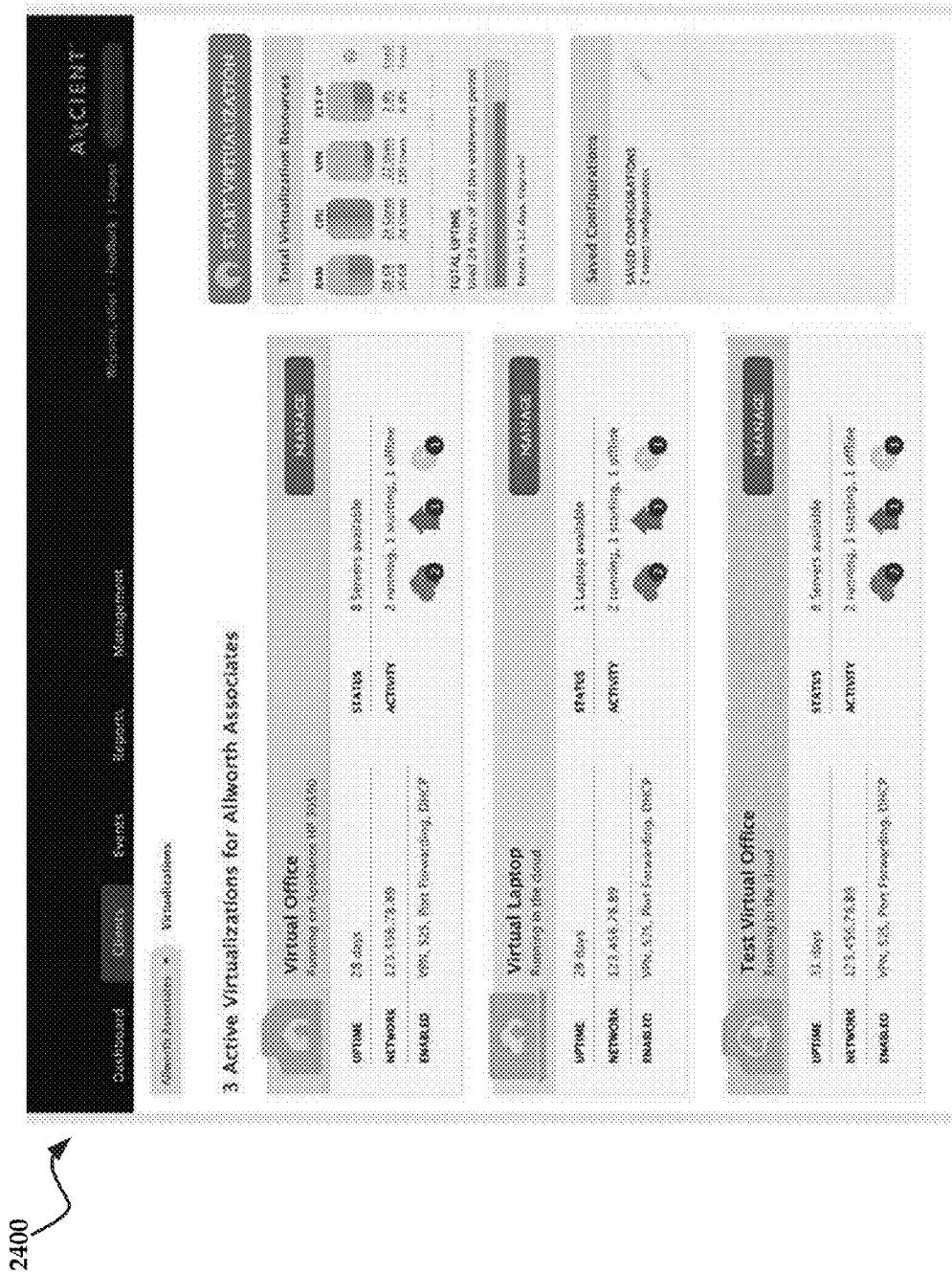
FIG. 24 is an exemplary interface that displays active virtualizations for a client.

FIG. 24 illustrates an exemplary Client interface 2400 that lists active virtualizations for a particular client. The first virtualization shown represents VM's running within a client's network on the backup appliance. The second shows a laptop virtualized in the cloud, and the last entry represents a running cloud-based virtualization of the present technology. Client interface 2400 allows a client to see all the virtualization activity from one screen regardless of whether the virtualizations are local within their network, or in the cloud. The Client interface 2400 also includes a Test Virtualization Resources panel that includes metrics for a specified virtualization such as CPU, VPN, RAM, and so forth, as well as total uptime for the selected virtualization.

Figure 24A:
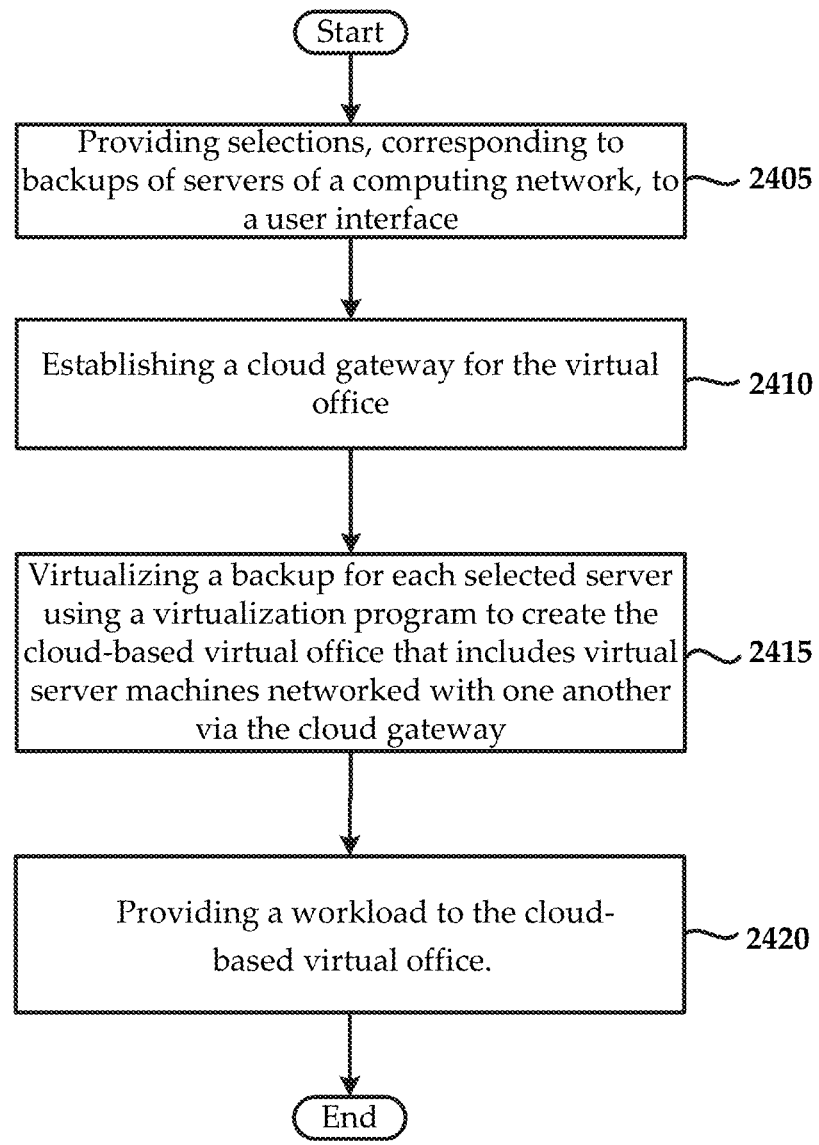
FIG. 24A illustrates an exemplary method for establishing a cloud-based virtual office.

FIG. 24A illustrates an exemplary method for establishing a cloud-based virtual office. In some embodiments the method may comprise a step 2405 of providing selections, corresponding to backups of servers of a computing network, to a user interface. Next, the method may comprise a step 2410 of establishing a cloud gateway for the virtual office. The cloud gateway may be configured with an IP address that corresponds to the physical gateway of a corresponding physical network. Also, the cloud gateway may include netmask information.

Next, the method may comprise a step 2415 of executing a backup for each selected server using a virtualization program to create the cloud-based virtual office that includes virtual server machines networked with one another via the cloud gateway. Additionally, the method may comprise a step 2420 of providing a workload to the cloud-based virtual office. In some instances, the workload provided to the cloud-based virtual office may comprise any workload that is processed by the physical network that the cloud-based network office has replaced. In some instances, the workload may comprise providing a website, executing an application or program, and delivering content—just to name a few. In other instances, the workload may also comprise providing an end user with access to the cloud-based virtual office.

Figure 25:
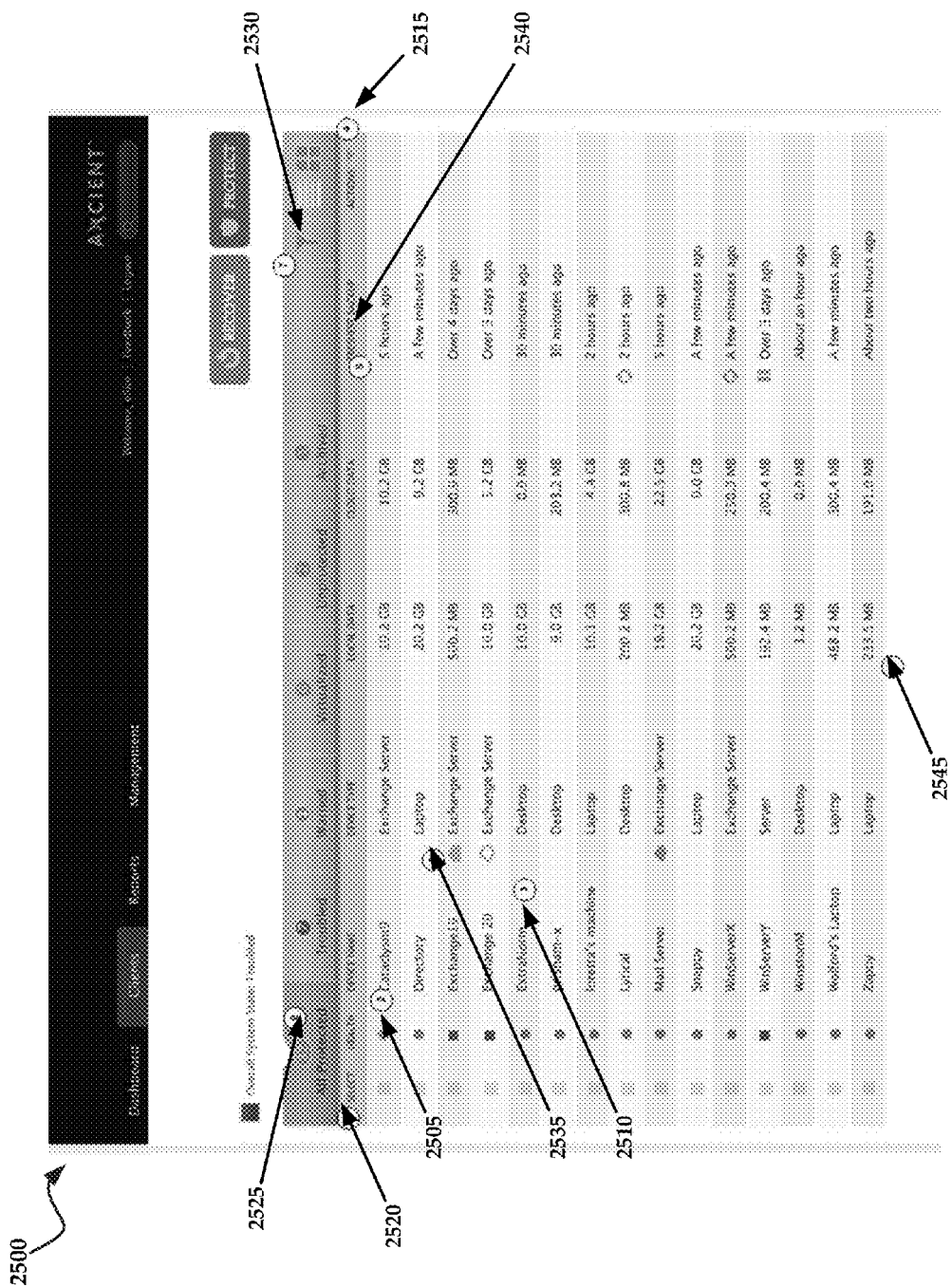
FIG. 25 is an exemplary user interface that comprises a Device Inventory Navigation Table.

FIG. 25 is an exemplary user interface 2500 that comprises a Device Inventory Navigation Table. Although not shown, a client name displayed in the upper left corner of the user interface 2500 is clickable and takes the user back to the client details page. A device name 2505 "Cataclysm9" is shown along a first row of the Device Inventory Navigation Table. Clicking on the device name 2505 may redirect the user to the device details page. The table shows a combined protection health status and related information along with cloud virtualization status information for each given device.

Clicking anywhere in the device inventory row 2510 may open the device summary pane. Exceptions are if the column has its own click handling. For example, the Device Name column or the actions column. According to some embodiments, an actions column header 2515 may not perform a table sort as other column headers do, but may cause the display of a set of global actions that can be performed against the selected devices in the table. If no devices are selected, then the only action available to the user is "Select all shown" which selects all the checkboxes for the devices currently in the table, and then the actions in the menu are updated to show the complete list of actions available for mass operations. Exemplary global actions that are available include: Recover selected, Pause selected, Protect selected, and so forth.

A select column header action 2520 may be utilized to select all (or a portion) of the current displayed rows. Clicking a pre-filter tab of Device Inventory Tabs 2525 will display the list in pre-filtered as its respective name implies. "All Protected" shows all protected devices no matter the state of the device. This may not include Unprotected or Archived devices. Troubled and Warned show devices that have a status of troubled or warned as appropriate. Any device that is virtualized either locally or in the cloud is listed in the virtualized filtered device list.

In some instances, only cloud virtualized devices are listed. Unprotected column shows devices that are detected on the client's network, but may not have a protection policy. This includes "ignored" unprotected devices. Non-active tabs may be placed into a hover state. The white caret (e.g., triangle icon) indicates the currently selected tab, and slides across the tab bar from one tab to a newly selected tab as additional tabs are selected.

A filter tab 2530 may be selected to take the user to a list of all devices (protected, unprotected, archived, and so forth) that can be filtered. Devices that are virtualized have a status icon 2535 provided in the device inventory list view. If the device is virtualized locally and in the cloud (e.g., virtual office) then two icons may be shown. The icon may also denote whether the virtualization is test or production.

Time entries displayed for each device may be shown relative to the client's timezone preference. A freshest backup column 2540 may be sortable, and may not be dynamically updated as time progresses. The table may also comprise a timezone specification as well as an infinite scroll 2545. An initial forty rows may be loaded and displayed. More rows may be loaded as the user scrolls to the bottom of the page.

Figure 26:
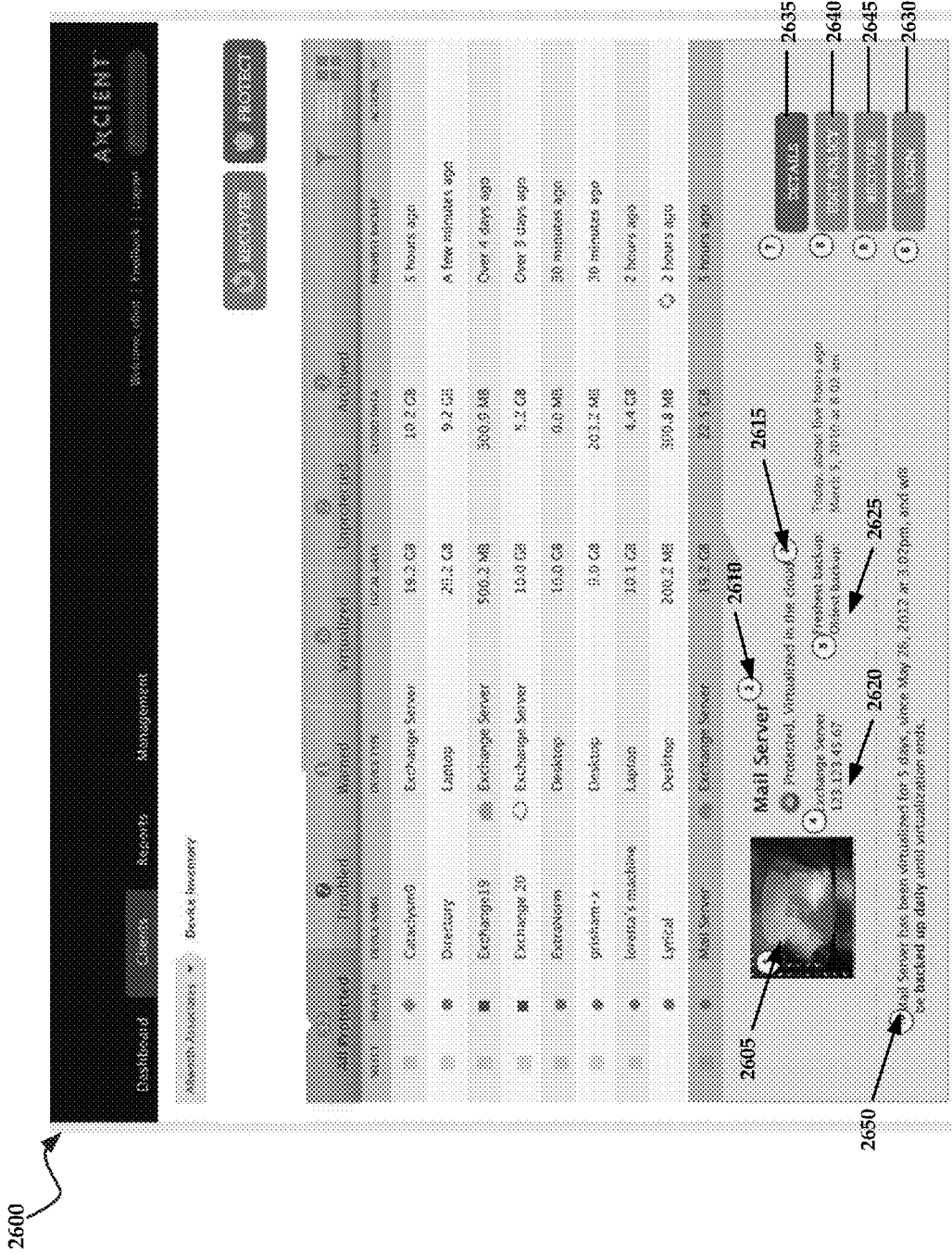
FIG. 26 illustrates an exemplary user interface that comprises a Device Table that includes a Device Summary Pane Desktop Image.

FIG. 26 illustrates an exemplary user interface 2600 that comprises a Device Table that includes a Device Summary Pane Desktop Image 2605. In some embodiments, the Device Summary Pane Desktop Image 2605 is the substantially the same as the desktop image displayed for the device in the carousel navigation of the device inventory. Clicking the Device Summary Pane Desktop Image 2605 takes the user to the device details page. The desired capability is to allow the user to login to the device regardless of whether the device is the physical device, locally virtualized device, or cloud virtualized device.

A user given device name 2610, or hostname if the user has not given the device a name, may be shown. Clicking the user given device name 2610 may redirect the user to the device details. The device status in a summary 2615 includes, for example, the protection status, the virtualization activity for the device, and the current protection activity for the device (e.g., running, idle, paused, etc.). For unprotected devices, the protection status is "Unprotected". For archived devices the status is "archived". Device details 2620 may comprise information that describes the detected/specified device type and current specified IP address within the system.

Age details 2625 may include the date of the oldest recovery point, shown as the most recent. The display of each recovery point may be driven by the human readable date/time display which is relative to the current time. The date/times for the backups are the completion date/times for the backup. Hovering and/or clicking on the relative times shows the absolute time in a tooltip style popout, or other visual display that would be known to one of ordinary skill in the art. Human readable time may be specified elsewhere.

A login button 2630 may be selected to display the web VNC client in a new window for Devices that are currently virtualized in a cloud failover and running. Local appliance failovers may not be given a Login button, although in some instances they may.

Clicking details button 2635 may direct the user to the device details page. Clicking the edit policy button 2640 may open a Protect flow with the current protection policy for this device and allows the user to make changes to the device's protection policy. Clicking recover button 2645 may open the Recover flow with this device preselected as the target of the recovery operation.

A device description section 2650 may comprise a human readable summary of the device protection policy and current protection and virtualization activity.

Figure 27:
FIG. 27 is an exemplary user interface that comprises a Specifications Device Table.

FIG. 27 is an exemplary user interface 2700 that comprises a Specifications Device Table. The user interface 2700 may allow end users to add criteria by clicking an add criteria button 2710, which adds another filter criteria row to the filter specification. The end user may remove current filter criteria rows by clicking a remove criteria button 2705. Filter criteria rows dropdown boxes 2715 represent an AND (e.g., conjunctive) relationship between values. The Filter criteria may be "Anded" with a search value. A "none" parameter may be set by default so that all devices are shown. The filter parameters that are present in the filter criteria rows dropdown boxes 2715 may comprise, but are not limited to, Protection Status, Type, Virtualization type, Tag, O/S Type, Current activity (Paused/Running), Service ID, IP address.

The user interface 2700 may also comprise a search input 2720 that allows end users to input a search string that filters the list page contents to any devices that have a portion of the search text present in the Device Name.

Figure 28:
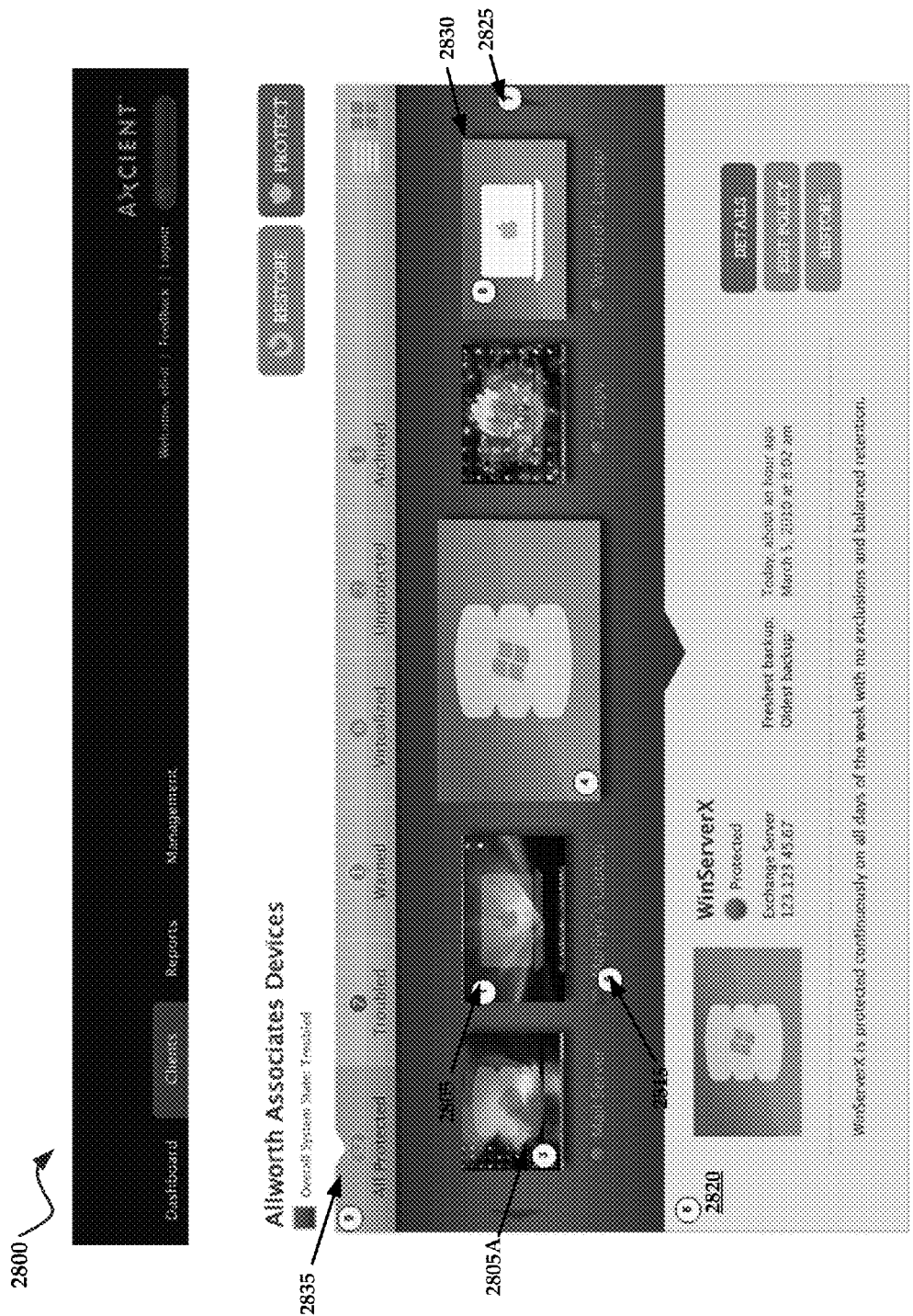
FIG. 28 is an exemplary user interface that comprises Device Visualizations.

FIG. 28 is an exemplary user interface 2800 that comprises Device Visualizations. The user interface 2800 may comprise a desktop screen grab 2805 arranged into a carousel view. Clicking a not-currently-active device's desktop image such as Desktop Image 2805A causes the image to carousel to the center. If the desktop image is the rightmost or leftmost image, then empty space is shown to the left or right as appropriate. The desktop images may be periodically refreshed at a predetermined interval. The desktop images may be sorted in alphabetic order based on the device name.

Clicking a device name 2815 may direct the user to the Device Details page for the device. A device summary pane 2820 may be displayed in the carousel view and may include the same functionality as the summary panes displayed in the device table view. Clicking a navigation object 2825 may cause the desktop images to horizontally scroll. For example, pressing the right arrow, causes the desktop images to scroll left by one image. On scroll, a new currently active device's summary pane may be loaded and displayed. A desktop image icon 2830 may be shown on top of the desktop image, if a desktop image is provided. If no desktop image is provided, then the desktop image icon 2830 may be displayed in place of the desktop image on top of a background. The overlay image may be predicated on the device type, and operating system type. The user interface 2800 may also comprise Device Inventory Tabs 2835, which have been described in greater detail above.

Figure 29:
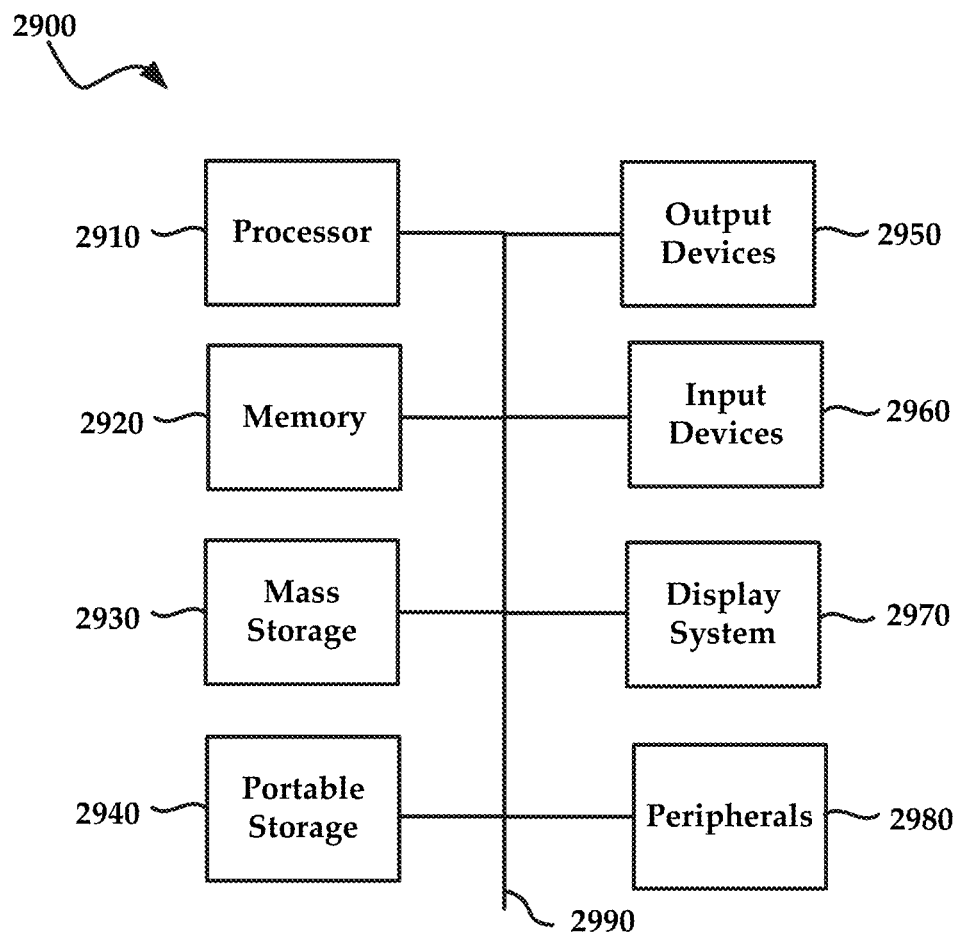
FIG. 29 illustrates an exemplary computing system that may be used to implement embodiments according to the present technology.

FIG. 29 is a block diagram of an exemplary computing device. The computing device of FIG. 29 may be used to implement computing device, web server, application server and third party web server. The computer system 2900 includes one or more processors 2910 and main memory 2920. Main memory 2920 stores, in part, instructions and data for execution by processor 2910. Main memory 2920 can store the executable code when in operation. The computer system 2900 further includes a mass storage device 2930, portable storage medium drive(s) 2940, output devices 2950, user input devices 2960, a graphics display 2970, and peripheral device(s) 2980.

The components shown in FIG. 29 are depicted as being connected via a single bus 2990. The components may be connected through one or more data transport means. The processor 2910 and the main memory 2920 may be connected via a local microprocessor bus, and the mass storage device 2930, the peripheral devices 2980, the portable storage medium drive(s) 2940, and graphics display 2970 may be connected via one or more input/output (I/O) buses.

The mass storage device 2930, which may be implemented with a magnetic disk drive or an optical disk drive, is a non-volatile storage device for storing data and instructions for use by the processor 2910. The mass storage device 2930 can store the system software for implementing embodiments of the present technology for purposes of loading that software into the main memory 2920.

The portable storage device 2940 operates in conjunction with a portable non-volatile storage medium, such as a floppy disk, compact disk, digital video disc, or USB storage device, to input and output data and code to and from the computer system 2900 of FIG. 29. The system software for implementing embodiments of the present technology may be stored on such a portable medium and input to the computer system 2900 via the portable storage device 2940.

The user input devices 2960 provide a portion of a user interface. The user input devices 2960 may include an alpha-numeric keypad, such as a keyboard, for inputting alpha-numeric and other information, or a pointing device, such as a mouse, a trackball, stylus, or cursor direction keys. Additionally, the computer system 2900 as shown in FIG. 29 includes the output devices 2950. Suitable output devices include speakers, printers, network interfaces, and monitors.

The graphics display 2970 may include a liquid crystal display (LCD) or other suitable display device. The graphics display 2970 receives textual and graphical information, and processes the information for output to the display device.

The peripheral device(s) 2980 may include any type of computer support device to add additional functionality to the computer system. The peripheral device(s) 2980 may include a modem or a router.

The components associated with the computer system 2900 of FIG. 29 are those typically found in computer systems that may be suitable for use with embodiments of the present technology and are intended to represent a broad category of such computer components that are well known in the art. Thus, the computer system 2900 of FIG. 29 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, webOS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While certain exemplary embodiments have been described and shown in the accompanying drawings, it is to be understood that such embodiments are merely illustrative and not restrictive of the broad disclosure and that this disclosure is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A method for managing a cloud-based virtual machine, the method comprising:
   providing one or more selections corresponding to one or more backups of a computing device via a user interface to an end user;
   receiving a selection of at least one of the one or more backups;
   receiving configuration details for the computing device, the configuration details comprising computing resources that are to be dedicated to a cloud-based virtual office that corresponds to the computing device;
   virtualizing the backup within a cloud computing environment using a virtualization program to create the cloud-based virtual office having the configuration details;
   providing access to the cloud-based virtual office to a remote user; and
   receiving network settings for the cloud-based virtual office via a user interface that allows an end user to any of:
   enable VPN access to the cloud-based virtual office, enable port forwarding for the cloud-based virtual office, enable inbound/outbound connections for the cloud-based virtual office, enable DHCP for the cloud-based virtual office, and combinations thereof.

2. The method according to claim 1, further comprising establishing a cloud gateway for the cloud-based virtual office by receiving gateway information and netmask information for the cloud-based virtual office.

3. The method according to claim 1, wherein providing access to the cloud-based virtual office to a remote user comprises establishing at least one client Internet protocol address and at least one set of VPN access credentials.

4. The method according to claim 1, further comprising receiving network settings for the cloud-based virtual office comprising any of VPN information, DHCP information, port forwarding information, or any combinations thereof.

5. The method according to claim 4, further comprising:
   updating the network settings for the cloud-based virtual office by receiving updated gateway and netmask information for the cloud-based virtual office; and applying the updated gateway and the updated netmask information to the cloud-based virtual office.

6. The method according to claim 5, further comprising managing Internet connectivity of the cloud-based virtual office by enabling or disabling inbound or outbound data transfer relative to the cloud-based virtual office.

7. The method according to claim 1, further comprising establishing virtual network computing (VNC) access to the cloud-based virtual office by specifying one or more Internet protocol addresses that are to be used when an Internet protocol address of a cloud gateway is unavailable.

8. The method according to claim 1, further comprising establishing port forwarding settings for the cloud-based virtual office by receiving an external port number, an internal Internet protocol address, and an internal port address from an end user via a port forwarding user interface; and applying at least a portion of the port forwarding settings to the cloud-based virtual office.

9. The method according to claim 1, further comprising establishing dynamic host configuration protocol settings for the cloud-based virtual office by receiving one or more domain names and one or more DNS server Internet protocol address associated with the one or more domain names from an end user via a DHCP user interface; and applying the dynamic host configuration protocol settings to the cloud-based virtual office.

10. The method according to claim 9, further comprising assigning at least one of the one or more DNS server Internet protocol address of the cloud-based virtual office to a virtual machine by associating a media access control address of the virtual machine with the at least one of the one or more DNS server Internet protocol address.

11. The method according to claim 1, further comprising establishing site-to-site virtual private network settings for the cloud-based virtual office by:
  establishing a local machine that will execute a VPN endpoint image;
  defining an endpoint name for the local machine within the cloud-based virtual office;
  establishing network settings for the local machine;
  downloading the VPN endpoint image to the local machine;
  executing the VPN endpoint image using a virtualization program to create a virtual machine; and
  adding the virtual machine to a network routing table of the cloud-based virtual office.

12. The method according claim 1, further comprising executing a virtual machine for each server in the cloud-based virtual office by:
  receiving a selection of a backup for the virtual machine;
  receiving memory allocation settings for the virtual machine; and
  rendering the virtual machine.

13. The method according to claim 1, further comprising providing a virtual office user interface to an end user that comprises any of selectable network configuration tabs for the cloud-based virtual office, virtual machine information for each virtual machine within the cloud-based virtual office, a current status for the cloud-based virtual office, or combinations thereof.

14. The method according to claim 13, wherein the selectable network configuration tabs comprises any of VPN information, DHCP information, port forwarding information, or combinations thereof.

15. The method according to claim 1, further comprising:
  generating backups for the cloud-based virtual office; and
  populating a failover appliance with data included in the backups.

16. The method according to claim 1, further comprising providing a user interface that allows an end user to control any of the cloud-based virtual machine, a non-cloud-based virtual machine, and combinations thereof.

17. The method according to claim 16, wherein the user interface comprises representations of a backup status for each computing device, a current status for the cloud-based virtual machine that corresponds to the computing device, a visual representation of a status for the cloud-based virtual office, and any combinations thereof.

18. A method for establishing a cloud-based virtual office, the method comprising:
  providing selections, corresponding to backups of servers of a computing network, to a user interface;
  establishing a cloud gateway for the cloud-based virtual office;
  virtualizing a backup for each selected server using a virtualization program to create the cloud-based virtual office that includes virtual server machines networked with one another via the cloud gateway, wherein each virtual server machine has dedicated computing resources that comprise at least a selection of CPU core settings for a virtual machine;
  providing a workload to the cloud-based virtual office; and
  receiving network settings for the cloud-based virtual office via a user interface that allows an end user to any of:
  enable VPN access to the cloud-based virtual office, enable port forwarding for the cloud-based virtual office, enable inbound/outbound connections for the cloud-based virtual office, enable DHCP for the cloud-based virtual office, and combinations thereof.

19. A cloud-based virtual office executing within a computing environment, the cloud-based virtual office comprising virtual server machines that correspond to servers of a physical network, each of the virtual server machines being virtualized by a virtualization program from a backup of a physical server, the backup of the physical server being stored within memory of the computing environment, the virtualization program being executed by a processor of the computing environment upon an occurrence of a failover event, the processor further establishing a cloud gateway that networks the virtual server machines together, wherein each of the virtual server machines has dedicated computing resources that comprise at least a selection of CPU core settings for the virtual server machines; and
  a user interface that receives network settings for the cloud-based virtual office that allows an end user to any of:
  enable VPN access to the cloud-based virtual office, enable port forwarding for the cloud-based virtual office, enable inbound/outbound connections for the cloud-based virtual office, enable DHCP for the cloud-based virtual office, and combinations thereof.

20. The cloud-based virtual office according to claim 19, wherein the computing environment further comprises an intermediary node between the physical network and a backup node that stores backups for at least a portion of the servers of the physical network.

21. The cloud-based virtual office according to claim 20, wherein the computing environment further comprises a failover appliance that is disposed locally to the physical network.

* * * * *